United States Patent [19]

McEntee

[11] Patent Number: 4,624,679

[45] Date of Patent: Nov. 25, 1986

[54] COMPOSITIONS CONTAINING ANTIMICORBIAL AGENTS IN COMBINATION WITH STABILIZERS

[75] Inventor: Thomas C. McEntee, Topsfield, Mass.

[73] Assignee: Morton Thiokol, Inc., Chicago, Ill.

[21] Appl. No.: 688,490

[22] Filed: Jan. 3, 1985

[51] Int. Cl.$^4$ .......................... C09B 67/00; C08K 5/13; C08K 5/59; A01N 11/02

[52] U.S. Cl. .......................................... 8/650; 523/122; 524/606; 428/907

[58] Field of Search .............................. 523/122; 8/650

[56] References Cited

U.S. PATENT DOCUMENTS

| | | | |
|---|---|---|---|
| 2,371,618 | 3/1945 | Hanson et al. | 523/122 |
| 2,689,837 | 9/1954 | Darby et al. | 523/122 |
| 2,802,811 | 8/1957 | Somerville et al. | 523/122 |
| 3,096,183 | 7/1963 | Genth et al. | 523/122 |
| 3,105,060 | 9/1963 | Schramm et al. | 523/122 |
| 3,133,072 | 5/1964 | Shibe et al. | 523/122 |
| 3,223,547 | 12/1965 | Binder et al. | 523/122 |
| 3,288,674 | 11/1966 | Yeager | 523/122 |
| 3,317,441 | 5/1967 | Baudin | 523/122 |
| 3,360,431 | 12/1967 | Yeager | 523/122 |
| 3,833,520 | 9/1974 | Tirpak et al. | 523/122 |
| 4,049,822 | 9/1977 | Rei et al. | 523/122 |
| 4,086,297 | 4/1978 | Rei et al. | 523/122 |

FOREIGN PATENT DOCUMENTS

| | | | |
|---|---|---|---|
| 0141466 | 9/1952 | Japan | 523/122 |
| 6911454 | 10/1969 | Netherlands . | |

OTHER PUBLICATIONS

"Evaluation of Biocides for Treatment of PVC Film", Kaplan et al, Polymer Engineering & Sci., Jul. 1970, vol. 10, #4.

*Primary Examiner*—Herbert J. Lilling
*Attorney, Agent, or Firm*—George F. Wheeler; Gerald K. White

[57] ABSTRACT

Composition of an antimicrobial agent and an antioxidant having improved antimicrobial activity compared to the antimicrobial agent alone. The preferred environment of the invention is a composition of a thermoplastic resin, an antioxidant, and an antimicrobial agent, the latter two being compatible with the resin. The resin composition can contain other usual additives, and can be melt processed at an elevated temperature to form articles such as films or fibers having improved antimicrobial activity. A method for improving the efficacy of an antimicrobial agent by combining it with an antioxidant is disclosed. A method for melt-processing a resin composition containing an antimicrobial material is also disclosed, wherein the resin composition includes an antioxidant. The inventors have thus discovered and solved the problem of oxidation of an antimicrobial composition, particularly a resin composition containing an antimicrobial agent, which arises when the composition is processed at elevated temperatures, as are typically encountered when forming a fiber or film of the composition.

64 Claims, No Drawings

COMPOSITIONS CONTAINING ANTIMICORBIAL AGENTS IN COMBINATION WITH STABILIZERS

TECHNICAL FIELD

The present invention relates to thermoplastic articles and compositions containing antimicrobial agents and to novel stabilizers for antimicrobial agents.

BACKGROUND ART

It is well known that antimicrobial agents can be incorporated into thermoplastic materials during fabrication so the resulting thermoplastic articles will resist microbial growth. Thermoplastic compounds which are candidates for treatment include materials such as polyamides (nylon 6 or 6,6), polyvinyl chloride (with or without plasticizing agents), polyolefins, polyurethanes, polyethylene terephthalate (polyester), styrene-butadiene rubbers, other elastomers, etc. Antimicrobial agents which are candidates for incorporation into such thermoplastic materials include, but are not limited to, phenoxarsines (including bisphenoxarsines), phenarsazines (including bisphenarsazines), maleimides, isoindole dicarboximides having a sulfur atom bonded to the nitrogen atom of the dicarboximide group, halogenated aryl alkanols, isothiazolinone compounds, and organotin compounds. Others have also been used.

The known microbiocidal phenoxarsine and phenarsazine compounds include compounds represented by the formulas:

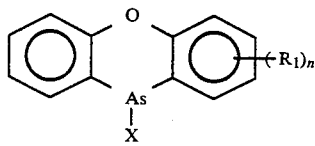

and

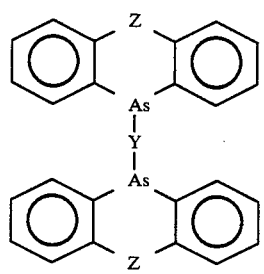

where X is halogen or thiocyanate, Y is oxygen or sulfur, Z is oxygen or NH, $R_1$ is halogen, lower alkyl (having from 1 to about 6 carbon atoms), or thiocyanate, and n is from 1 to 4 inclusive. Examples of these phenoxarsines and phenarsazines include, but are not limited to:

10-chlorophenoxarsine;
10-iodophenoxarsine;
10-bromophenoxarsine;
4-methyl-10-chlorophenoxarsine;
2-tert-butyl-10-chlorophenoxarsine;
1,4-dimethyl-10-chlorophenoxarsine
2-methyl-8,10-dichlorophenoxarsine;
1,3,10-trichlorophenoxarsine;
2,6,10-trichlorophenoxarsine;
2,8,10-trichlorophenoxarsine;
1,2,4,10-tetrachlorophenoxarsine;
1,2,4,10-thiocyanatophenoxarsine;
10-thiocyanatophenoxarsine;
10,10'-thiobisphenoxarsine;
10,10'-oxybisphenarsazine;
10,10'-thiobisphenarsazine; and
10,10'-oxybisphenoxarsine (OBPA).

Many of these materials are described in U.S. Pat. No. 3,288,674, issued to Yeager Nov. 19, 1966.

The microbiocidal maleimide compounds are exemplified by N-(2-methylnaphthyl)maleimide.

The microbiocidal isoindole dicarboximides having a sulfur atom bonded to the nitrogen atom of the dicarboximide group contain at least one group having the structure:

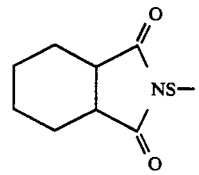

wherein the hexagonal ring can have one to three sites of ring saturation.

Particular isoindole dicarboximides are the following:

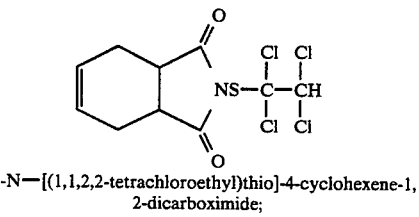

bis-N—[(1,1,2,2-tetrachloroethyl)thio]-4-cyclohexene-1,2-dicarboximide;

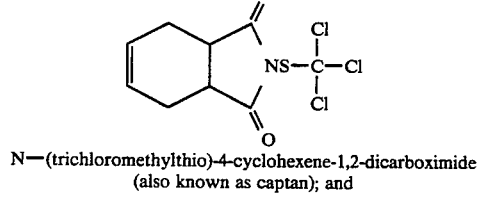

N—(trichloromethylthio)-4-cyclohexene-1,2-dicarboximide (also known as captan); and

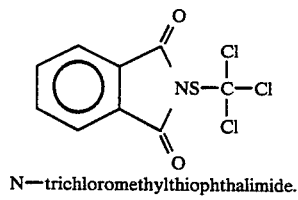

N—trichloromethylthiophthalimide.

An example of a isothiazolinone compound which has been found useful is 2-(n-octyl-4-isothiazolin-3-one).

Other known antimicrobial agents are: bis(tri-n-butyl tin)oxide (TBTO); pentachlorophenol and its salts; zinc Omadine (a zinc derivative of pyridinethione sold by Olin Chemicals, Stamford, Conn.); 2'-hydroxy-2,4,4'-trichlorodiphenylether (Irgasan DP-300, sold by Ciba-Geigy Corporation, Plastics and Additives Division, Hawthorne, N.Y.); 2,4,5,6-tetrachloroisophthalonitrile (Daconil 2787, sold by Diamond Alkali Company, Cleveland, Ohio); and 2-(4-thiazolyl)benzimidazole (trade name Tektamer 100, sold by the Calgon Division of Merck & Co., Inc., Rahway, N.J.).

In all of these combinations of an antimicrobial agent and a thermoplastic material, the antimicrobial agent must: (1) have sufficient heat stability to avoid being destroyed or losing potency during fabrication; (2) not react with the thermoplastic resin nor any of its additives at elevated processing temperatures and other conditions; and (3) not become volatilized. In addition, the antimicrobial control agent should not impart undesirable features (odor, embrittlement) to the resin at use concentrations. A final requirement is that the composition effectively control microbial growth throughout the intended life of the finished article.

Synthetic fiber manufacture subjects the fiber composition to extremely rigorous conditions. For example, the fiber composition is melted and held at an elevated temperature prior to spinning. When spun, the composition is subjected to extremely high pressures and is further heated by the friction of extrusion. The extruded filaments are then cooled by ventilating them with air. The filaments have a large surface to volume ratio, and thus the composition is extensively exposed to atmospheric oxygen while cooling.

U.S. Pat. No. 3,345,341 claims thermoplastic compositions formed by blending an antimicrobial agent at a suitable ratio with chips of the polymer form prior to fabrication. The compositions are then spun into fibers. The degradation problem and possible solutions are not discussed.

U.S. Pat. No. 2,919,200 (Dubic, et al.) teaches incorporating a bacteriostatic agent in a thermoplastic composition, but simply specifies that the bacteriostatic agent should have a decomposition temperature above the molding temperature of the plastic. Many existing antimicrobial agents do not meet this criterion.

Similarly, U.S. Pat. No. 3,959,556 (Morrison) describes the preparation of synthetic fibers which incorporate an antimicrobial agent, and claims antimicrobial properties are possessed by blends of the treated synthetic fiber with naturally occurring fibers.

U.S. Pat. No. 3,279,986 (Hyman) describes preparation of a thermoplastic sheet material incorporating an antimicrobial agent. The specific antimicrobial agents clamed also are claimed to improve the thermal susceptibility of the sheet material. ("Thermal susceptibility" refers to the well known off-color that results from heating polyvinyl chloride resin materials.)

A weakness of all these patents is their failure to disclose that the antimicrobial agent present in the finished material often lacks some or all of its potency as a result of degradation during processing.

For example, if 500 parts per million (ppm) of OBPA is blended into a nylon composition, which is formed into fiber using conventional melt-spinning technology, only about 100 ppm of active OBPA will be present in the fiber.

This degradation has two important disadvantages. First, much of the antimicrobial agent is wasted so more of the agent must be incorporated in the chosen composition to provide a desired level of performance. Second, the decomposition products of the antimicrobial agent may be more easily released from a thermoplastic composition than the active agent. For example, when nylon fibers containing OBPA are vat dyed, much of the decomposition product (phenoxyarsenic acid) formed as a result of fiber fabrication migrates into the dye bath, necessitating removal before the dye effluent is released into the environment. If the amount of decomposition of OBPA during fiber formulation were reduced, the leaching of the phenoxyarsenic acid from fibers would be reduced.

Further, some known biological agents are not selected in these patents because the omitted agents are known to be insufficiently resistant to thermal inactivation.

The literature discloses using antioxidants in polymeric plastic compositions. There is a wide spectrum of needs for such antioxidants in different polymers and plastic compounds. For example, some resin compositions cannot be fabricated at all without antioxidants, while polyvinyl chloride compositions and polyamide (such as nylon) compositions do not benefit substantially from inclusion of an antioxidant except during high-temperature fabrication.

The following materials are known to act as antioxidants for plastic compositions:

A
MONOPHENOLS 1. 2,6-Di-t-butyl-p-cresol or 2,6-Di-t-butyl-4-methylphenol

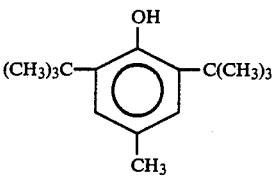

Mole Weight 220
White powder, flakes, granules or pellets
Melt Point 69–70° C.
Specific Gravity 1.04–1.05

| TRADENAME | SUPPLIER |
|---|---|
| BHT | Koppers |
| CAO-1 | Sherwin-Williams |
| CAO-3 | Sherwin-Williams |
| DBPC | Koppers |
| DBPC-80 (1) | Koppers |
| Ionol | Shell |
| Ionol CP | Shell |
| Lowinox BHT | Lowi |
| Naugard BHT | Uniroyal |
| Permanax BHT | Vulnax |
| Sustane BHT | UOP |
| Sustane 1-F | UOP |
| Vanox PC | Vanderbilt |
| Vanox PC-X | Vanderbilt |
| Vulkanox KB | Mobay |

(1) 80%

2. Styrenated phenol

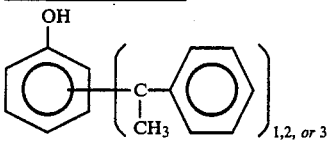

Viscous straw colored liquid
Specific Gravity 1.08

General purpose non-staining antioxidant used in rubber and latex.

| TRADENAME | SUPPLIER |
|---|---|
| WINGSTAY S | GOODYEAR |
| WINGSTAY S Powder (1) | GOODYEAR |
| Antioxidant SP (2) | Harwick |
| Lowinox P24S | Lowi |
| Naugard SP | Uniroyal |
| Naugard SP Powder (3) | Uniroyal |
| Nevastain 21 | Neville |
| Nevastain 2170 (3) | Neville |
| Permanax SP (4) | Vulnax |
| Permanax SP(L) | Vulnax |
| Stabilite SP 49-464 (5) | Reichhold |
| Styrenated Phenol | Ferro/Productol |
| Vanox 102 | Vanderbilt |

A
MONOPHENOLS

Vanox 1002 — Vanderbilt (1) 65% Active on inert carrier
(2) Active concentration not listed - Specific Gravity 1.56
(3) 70% Active on inert carrier - Specific Gravity 1.32
(4) 60% Active on inert carrier
(5) Listed as 'polymeric styrenated phenol'

3. 2- and 3-t-Butyl-4-hydroxyanisole or
   2- and 3-t-Butyl-4-methoxyphenol

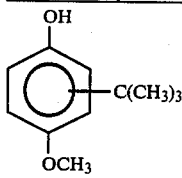

Mole Weight 180
White or off-white tablets or pellets
Melt Point 48–57° C.
Specific Gravity 1.04

General purpose antioxidant frequently used in foods.

| TRADENAME | SUPPLIER |
|---|---|
| Sustane BHA | UOP |
| Tenox BHA | Eastman |

4. Alkylated hindered phenols

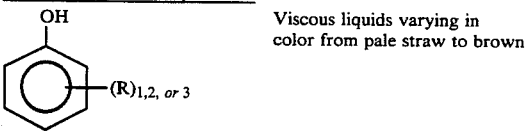

Viscous liquids varying in color from pale straw to brown

R's may be methyl or other alkyl groups, the larger ones usually being tertiary. Frequently more than one type of group is present. General purpose antioxidants and polymer stabilizers for rubber and plastics. These generally have good color and stain properties.

| TRADENAME | SUPPLIER | SPECIFIC GRAVITY |
|---|---|---|
| WINGSTAY C | GOODYEAR | 1.01 |
| WINGSTAY T | GOODYEAR | 0.91 |
| WINGSTAY V | GOODYEAR | 1.02 |
| Antioxidant 431 | Uniroyal | 1.08 |
| CAO-42 | Sherwin-Williams | 0.93 |
| Cyanox LF | Cyanamid | 1.06 |
| Cyanox 251 (1) | Cyanamid | 1.39 |
| Cyanox 1735 | Cyanamid | 0.90 |
| Ethyl Antioxidant 733 | Ethyl | 0.94 |
| Ethyl Antioxidant 735 | Ethyl | 0.95 |
| Hydrochem AO-535C | Continental Products | 0.90 |
| Lowinox P24A | Lowi | |
| Naugard 431 | Uniroyal | 1.08 |
| Permanax WSL | Vulnax | 1.00 |
| Permanax WSL Powder | Vulnax | 1.26 |
| Prodox 246 | Ferro/Productol | 0.931 |
| Prodox 340 | Ferro/Productol | 0.958 |
| Prodox 345 | Ferro/Productol | 0.959 |
| Stabilite White Powder 49-454 | Reichhold | 1.32 |
| Stabilite White Liquid 49-455 | Reichhold | 0.91 |
| Stabilite 49-470 (2) | Reichhold | |
| Stabiwhite Powder | CP Hall | 1.32 |
| Uvinox 1494 | GAF | 0.90 |
| Vanox 100 | Vanderbilt | 1.03 |
| Vanox 100 Powder | Vanderbilt | 1.37 |
| Vulkanox DS/F (3) | Mobay | 1.3 |

(1) Cream white powder - contains an inert carrier
(2) White powder
(3) Contains 50% inorganic filler 5. 4-(Hydroxymethyl)-2,6-di-t-butylphenol

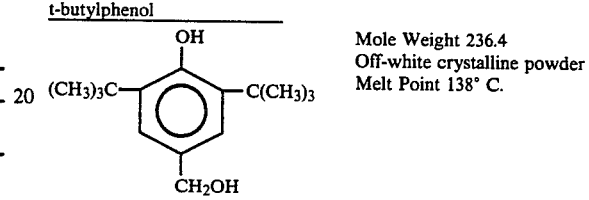

Mole Weight 236.4
Off-white crystalline powder
Melt Point 138° C.

| TRADENAME | SUPPLIER |
|---|---|
| Ethyl Antioxidant 754 | Ethyl |

6. 'Fortified' hindered phenol
(Structured not disclosed)

White powder
Melt Point 95° C. min.
Specific Gravity 1.30

General purpose phenolic antioxidant used in compounding where color and staining are critical.

| TRADENAME | SUPPLIER |
|---|---|
| Vanox ZS | Vanderbilt |

7. 2,6-Di-t-butyl-4-sec-butylphenol

Mole Weight 262
Amber liquid
Specific Gravity 0.90

(CH₃)₃C—[ring]—C(CH₃)₃
             |
           CHC₂H₅
             |
            CH₃

| TRADENAME | SUPPLIER |
|---|---|
| Isonox 132 | Schenectady |
| Vanox 1320 | Vanderbilt |

B
BISPHENOLS AND THIOBISPHENOLS 1. 2,2'-Methylenebis(6-t-butyl-p-cresol) or
   2,2'-Methylenebis(4-methyl-6-t-butylphenol)

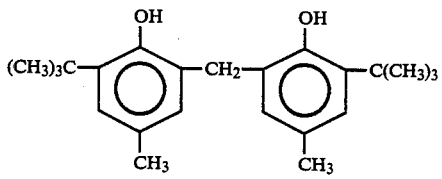

Mole Weight 341
White or light colored powder
Melt Point 133° C.
Specific Gravity 1.04–1.08

Antioxidant for rubber compounding. Some use in latex and plastics. Essentially non-staining, but can cause slight pink discoloration.

| TRADE NAME | SUPPLIER |
|---|---|
| Antioxidant MBP-5 | Aceto |
| CAO-5 | Sherwin-Williams |
| CAO-14 | Sherwin-Williams |
| Cyanox 2246 | Cyanamid |
| Lowinox 22M46 | Lowi |

-continued

B
BISPHENOLS AND THIOBISPHENOLS

| | |
|---|---|
| Oxy-Chek 114 | Ferro |
| Santowhite PC | Monsanto |
| Vanox 2246 | Vanderbilt |
| Vulkanox BKF | Mobay |

2. 2,2'-Methylenebis(4-ethyl-6-t-butylphenol)

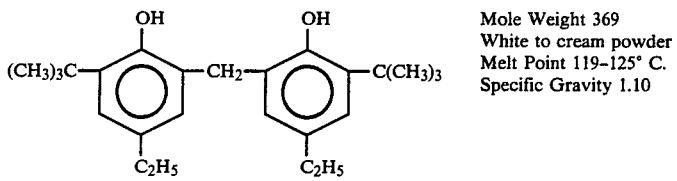

Mole Weight 369
White to cream powder
Melt Point 119–125° C.
Specific Gravity 1.10

General purpose antioxidant weaker than (B-1), but less discoloring.

| TRADE NAME | SUPPLIER |
|---|---|
| Cyanox 425 | Cyanamid |

3. 4,4'-Methylenebis(2,6-di-t-butylphenol)

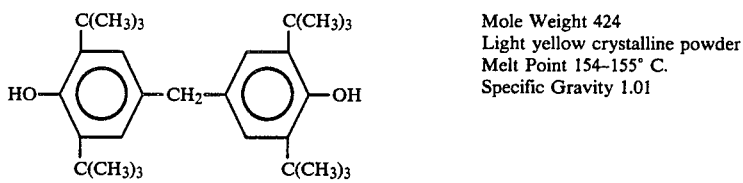

Mole Weight 424
Light yellow crystalline powder
Melt Point 154–155° C.
Specific Gravity 1.01

General purpose antioxidant-stabilizer. Also used in resins.

| TRADE NAME | SUPPLIER |
|---|---|
| Antioxidant MO14 | Aceto |
| Ethyl Antioxidant 702 | Ethyl |
| Ethyl Antioxidant 728 (1) | Ethyl |
| Lowinox 002 | Lowi |
| Prodox B-113 | Ferro/Productol |

(1) 'Soluble form'

4. Miscellaneous bisphenols - structures not revealed

| TRADE NAME | PHYS FORM | SPECIFIC GRAVITY | SUPPLIER |
|---|---|---|---|
| Cyanox 53 (1) | White powder | 1.74 | Cyanamid |
| Naugawhite | Amber liquid | 0.96 | Uniroyal |
| Naugawhite Powder (1) | Tan powder | 1.19 | Uniroyal |
| Permanax WSO | White powder | 1.00 | Vulnax |
| Wytox PAP | Amber liquid | 0.92 | Olin |
| Wytox PSP-S (1) | Tan powder | | Olin |
| Wytox PAP-SE (2) | Amber liquid | 0.92 | Olin |

(1) 'On an inert carrier'
(2) Self emulsifiable form 5. 2,2'-Ethylidenebis(4,6-di-t-butylphenol)

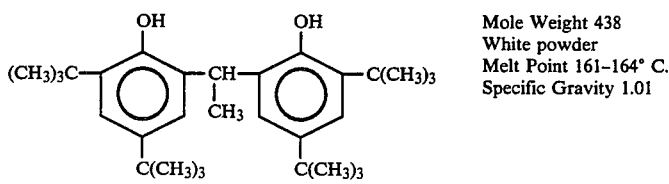

Mole Weight 438
White powder
Melt Point 161–164° C.
Specific Gravity 1.01

Antioxidant for rubber and plastics compounding.

| TRADE NAME | SUPPLIER |
|---|---|
| Isonox 129 | Schenectady |
| Vanox 1290 | Vanderbilt |

6. 2,2'-Methylenebis(4-methyl-6-(1-methylcyclohexyl)phenol)

B
BISPHENOLS AND THIOBISPHENOLS

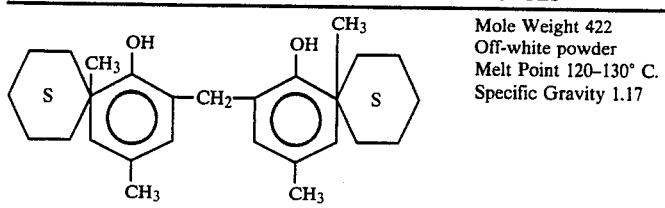

Mole Weight 422
Off-white powder
Melt Point 120–130° C.
Specific Gravity 1.17

Antioxidant for rubber and plastics compounding.

| TRADE NAME | SUPPLIER |
|---|---|
| Nonox WSP | ICI |
| Permanax WSP | Vulnax |
| Permanax WSP (PQ) | Vulnax |

7. 4,4'-Butylidinebis(6-t-butyl-m-cresol) or
   4,4'-Butylidenebis(6-t-butyl-3-methylphenol)

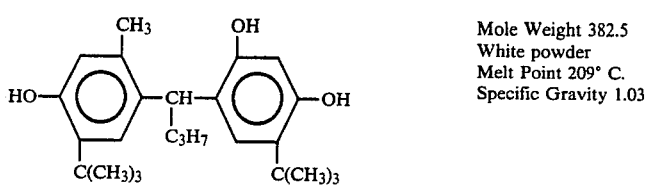

Mole Weight 382.5
White powder
Melt Point 209° C.
Specific Gravity 1.03

Antioxidant for rubber, latex and plastics compounding.

| TRADE NAME | SUPPLIER |
|---|---|
| Lowinox 44B25 | Lowi |
| Santowhite Powder | Monsanto |

8. Polybutylated Bisphenol A

Amber liquid
Specific Gravity 0.945–0.965

Antioxidant for rubber compounding and raw polymer stabilization.

| TRADE NAME | SUPPLIER |
|---|---|
| Agerite Superlite | Vanderbilt |
| Agerite Superlite Solid (1) | Vanderbilt |
| Lowinox P22B | Lowi |
| Vanox 1003 | Vanderbilt |
| Vanox 1004 (Powder) (1) | Vanderbilt |

(1) 75% Agerite Superlite or Vanox 1003 and 25% inert carrier Specific Gravity 1.26

9. 4,4'-Thiobis(6-t-butyl-m-cresol) or
   4,4'-Thiobis(6-t-butyl-3-metyhylphenol)

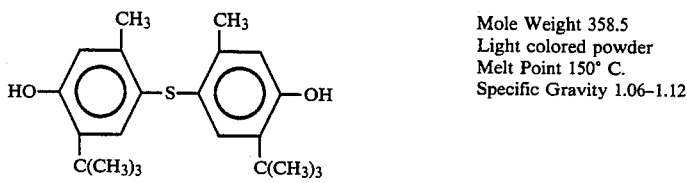

Mole Weight 358.5
Light colored powder
Melt Point 150° C.
Specific Gravity 1.06–1.12

Antioxidant for rubber, latex and plastics compounding. Widely used in CR. Activates CR cure systems.

| TRADE NAME | SUPPLIER |
|---|---|
| Antioxidant TBM6 (1) | Aceto |
| Lowinox 44S36 | Lowi |
| Santonox (2) | Monsanto |
| Santowhite Crystals | Monsanto |
| Santowhite MK (3) | Monsanto |

(1) Technical and pure grades available
(2) More pure form of Santowhite Crystals
(3) Reaction product grade 10. 4,4'-Methylenebis(2,6-dimethylphenol)

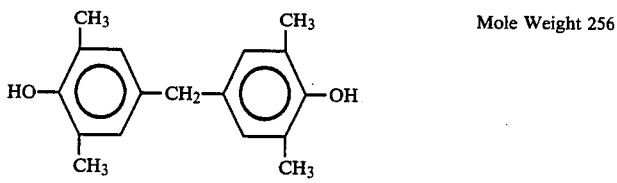

Mole Weight 256

-continued

B
BISPHENOLS AND THIOBISPHENOLS

| TRADE NAME | SUPPLIER |
|---|---|
| Lowinox 44M26 | Lowi |

11. 1,1'-Thiobis(2-naphthol)

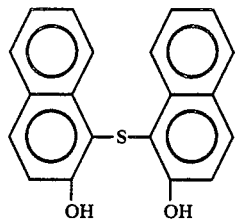

Mole Weight 318
Light yellow powder
Melt Point 218° C. Min.

| TRADE NAME | SUPPLIER |
|---|---|
| SAO-30 | Southland |

12. Methylene bridged polyalkylphenol

Solid
Specific Gravity 1.02

| TRADE NAME | SUPPLIER |
|---|---|
| Ethyl Antioxidant 738 | Ethyl |

13. 2,2'-Thiobis(4-methyl-6-t-butylphenol)

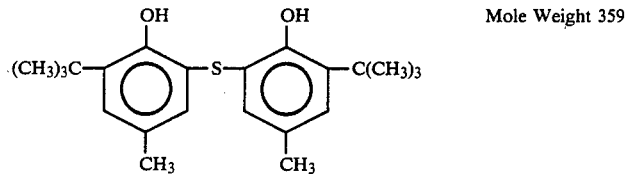

Mole Weight 359

| TRADE NAME | PHYS FORM | MELT POINT | SUPPLIER |
|---|---|---|---|
| SAO-4 | Light yellow powder | 70° C. Min. | Southland |
| SAO-6 | White powder | 83–86° C. | Southland |

14. Sulfur containing hindered phenol cyanurate

White powder
Melt Point 190–194° C.

| TRADE NAME | SUPPLIER |
|---|---|
| SAO-44 | Southland |

15. 2,2'-Isobutylidenebis(4,6-dimethylphenol)

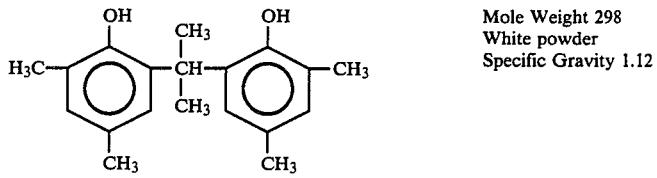

Mole Weight 298
White powder
Specific Gravity 1.12

| TRADE NAME | SUPPLIER |
|---|---|
| Lowinox 22IB46 | Lowi |
| Vulkanox NKF | Mobay |

16. 2,2'-Methylenebis(4-methyl-6-cyclohexylphenol)

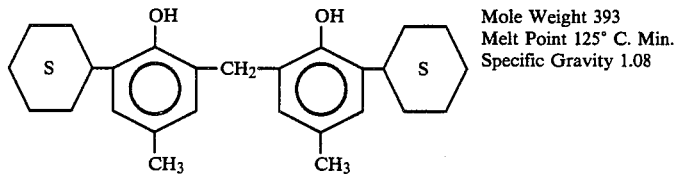

Mole Weight 393
Melt Point 125° C. Min.
Specific Gravity 1.08

| TRADE NAME | SUPPLIER |
|---|---|
| Vulkanox ZKF | Mobay |

C. POLYPHENOLS

1. Butylated reaction product of p-cresol and dicyclopentadiene

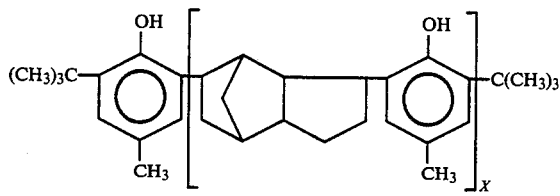

Average Mole Weight 600-700
White powder or amber flake
Melt Point 100° C.
Specific Gravity 1.10

Non-staining antioxidant for general and high temperature applications. Especially recommended for NR, IR, SBR, CR and carboxylated polymers. Widely used in latex.

| TRADE NAME | SUPPLIER |
|---|---|
| WINGSTAY L Flake | GOODYEAR |
| WINGSTAY L Powder | GOODYEAR |

2. Tetrakis(methylene 3-(3,5-di-t-butyl-4-hydroxyphenyl)propionate) methane or Tetrakis(methylene (3,5-di-t-butyl-4-hydroxyhydrocinnamate) methane

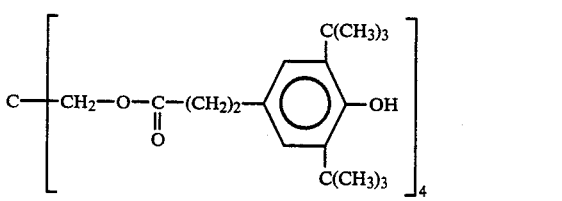

Mole Weight 1178
White crystalline powder
Melt Point 110-125° C.
Specific Gravity 1.45

| TRADE NAME | SUPPLIER |
|---|---|
| Irganox 1010 | CIBA-GEIGY |

3. 1,3,5-Trimethyl-2,4,6-tris(3,5-di-t-butyl-4-hydroxybenzyl)benzene

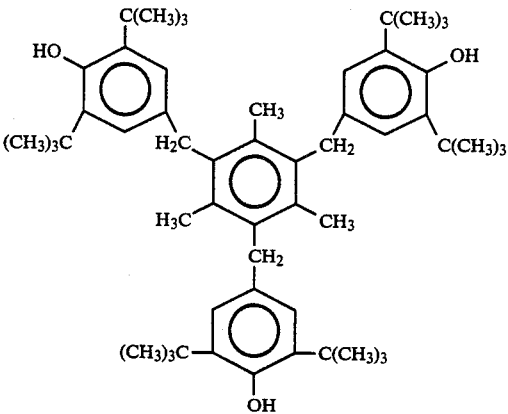

Mole Weight 775
White crystalline powder
Melt Point 244° C.

High performance antioxidant for plastics, rubber, resins and waxes.

| TRADE NAME | SUPPLIER |
|---|---|
| Ethyl Antioxidant 330 | Ethyl |

4. 1,3,5-Tris(3,5-di-t-butyl-4-hydroxybenzyl)-s-triazine-2,4,6(1H,3H,5H)trione or 1,3,5-Tris(3,5-di-t-butyl-4-hydroxybenzyl) isocyanurate

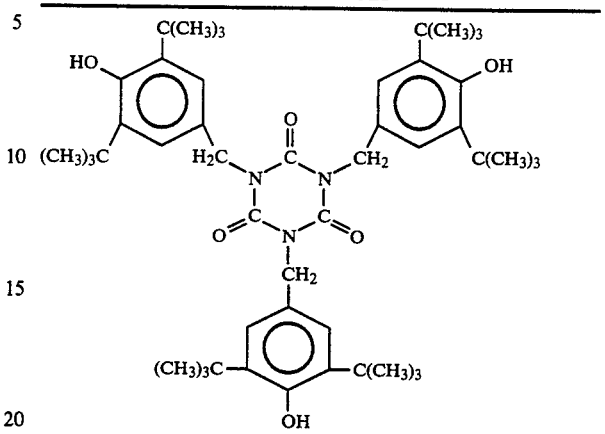

White crystalline powder
Melt Point 217-225° C.
Specific Gravity 1.03

High temperature antioxidant recommended for plastics.

| TRADE NAME | SUPPLIER |
|---|---|
| Agerite GT | Vanderbilt |
| Good-rite 3114 | Goodrich |
| Vanox GT | Vanderbilt |

5. 3:1 Condensate of 3-methyl-6-t-butylphenol with crotonaldehyde

White crystalline powder
Melt Point 182.5-188° C.

High performance antioxidant - recommended for plastics.

| TRADE NAME | SUPPLIER |
|---|---|
| Topanol CA | ICI |

6. Phenolic condensation products with structures not revealed.

General purpose antioxidants for rubber and plastics compounding.

| TRADE NAME | PHYS FORM | SPECIFIC GRAVITY | SUPPLIER |
|---|---|---|---|
| Akrochem Antiox 33 | White powder (M P 100° C. Min.) | 1.04 | Akron Chemical |
| Akrochem Antiox 36 | White powder (M P 148° C.) | 1.05 | Akron Chemical |
| Akrochem Antiox 51 | White powder (M P 118° C.) | 1.04 | Akron Chemical |
| Lowinox 22CP46 | Powder | | Lowi |
| Mark 328 | White powder | | Argus |
| Nevastain A | Liquid | 1.08-1.09 | Neville |
| Nevastain B | Flake (M P 55° C.) | 1.09-1.11 | Neville |
| Nevastain 76 | Amber flake (M P 134° C.) | 1.1 | Neville |
| Stabilite 49-466 | Powder (M P 110—110° C.) | 1.04 | Reichhold |
| Stabilite 49-467 | Powder (M P 148° C.) | 1.05 | Reichhold |
| Wytox PDA-S | Tan powder - contains inert carrier | | Olin |
| Wytox PMW | Amber powder (M P 122° C.) | 1.05-1.07 | Olin |

7. 4-((4,6-Bis(octylthio)-2-triazin-2-yl)amino)-2,6-di-t-butylphenol or 2,4-(Bis(n-octylthio)-6-(4-hydroxy-3,5-di-t-butylanilino)1,3,5-triazine

-continued
C
POLYPHENOLS

[Structure: 4-hydroxy-3,5-di-tert-butylphenyl-NH-triazine with SC8H17 groups]

White powder
Melt Point 93–98° C.

| TRADE NAME | SUPPLIER |
|---|---|
| Irganox 565 | CIBA-GEIGY |

Phenol/aldehyde condensates

General purpose antioxidants.

| TRADE NAME | PHYS FORM | SPECIFIC GRAVITY | SUPPLIER |
|---|---|---|---|
| Permanax EXP | Brown solid (M P 60° C.) | 1.07 | Vulnax |
| Permanax WMP (1) | Cream powder | 1.54 | Vulnax |

(1) Contains an inert carrier

D
HYDROQUINONE DERIVATIVES 1. 2,5-Di-t-amylhydroquinone

[Structure: hydroquinone with two t-amyl groups]

Mole Weight 250
Off-white crystalline powder
Melt Point 179° C.
Specific Gravity 1.02–1.05

Polymer stabilizer and shortshop; also used in adhesives; slightly discoloring.

| TRADE NAME | SUPPLIER |
|---|---|
| Santovar A | Monsanto |

2. t-Butylhydroquinone

[Structure: hydroquinone with t-butyl group]

Mole Weight 166
Off-white crystalline powder
Melt Point 127–129° C.

Polymer stabilizer and shortshop.

| TRADE NAME | SUPPLIER |
|---|---|
| Tenox TBHQ | Eastman |

3. Alkylated hydroquinone (structure not specified)

Viscous liquid (partially crystallizes)
Specific Gravity 0.90 @ 38° C.

Antioxidant stabilizer for synthetic rubbers and plastics.

| TRADE NAME | SUPPLIER |
|---|---|
| Antioxidant 451 | Uniroyal |

E
PHOSPHITES AND PHOSPHITE BLENDS

1. Tris(nonylphenyl) phosphite

[Structure: P(-O-C6H4-C9H19)3]

Amber, viscous liquid
Specific Gravity 0.98

Non-staining stabilizer for raw polymer SBR and plastics.

| TRADE NAME | SUPPLIER |
|---|---|
| Interstab CH-55 | Interstab |
| Lowinox TNPP | Lowi |
| Mark 1178 | Argus |
| Mark 1178B (1) | Argus |
| Naugard P | Uniroyal |
| Naugard PHR (1) | Uniroyal |
| Polygard | Uniroyal |
| Polygard HR (1) | Uniroyal |
| Weston TNPP | Borg-Warner |
| Weston 399 (2) | Borg-Warner |
| Weston 399B (2) | Borg-Warner |
| Wytox 312 | Olin |
| Wytox 320 | Olin |

(1) Hydrolysis resistant grades
(2) More hydrolytically stable, containing TIPA

2. Bis(2,4-di-t-butyl)pentaerythritol diphosphite

[Structure of bis(2,4-di-t-butylphenyl)pentaerythritol diphosphite]

Mole Weight 604
White crystalline solid
Melt Point 160–175° C.

Antioxidant-stabilizer for rubbers and plastics.

| TRADE NAME | SUPPLIER |
|---|---|
| Weston MDW-626 | Borg-Warner |

3. Distearyl pentaerythritol diphosphite

[Structure of distearyl pentaerythritol diphosphite]

Mole Weight 732
White flake
Melt Point 40° C.
Specific Gravity 0.94–0.96

Antioxidant for plastics.

| TRADE NAME | SUPPLIER |
|---|---|
| Weston 618 | Borg-Warner |
| Weston 619 (1) | Borg-Warner |

(1) More hydrolytically stable grade, containing TIPA

4. 'Polymeric' phosphites-structures not disclosed

General purpose antioxidants and stabilizers for rubber and plastics.

| TRADE NAME | PHYS FORM | SPECIFIC GRAVITY | SUPPLIER |
|---|---|---|---|
| Wytox 345 | Yellow liquid | 0.99 | Olin |
| Wytox 345-S (1) | White powder | | Olin |
| Wytox 438 | Yellow liquid | 1.01 | Olin |
| Wytox 438-S (1) | Gray powder | | Olin |
| Wytox 540 | Liquid | 1.003 | Olin |
| Wytox 540-S (1) | Gray powder | | Olin |

(1) Solid form on a carrier

5. Phosphited phenols and bisphenols-structures not revealed

General purpose antioxidants for rubber and plastics.

| TRADE NAME | PHYS FORM | SPECIFIC GRAVITY | SUPPLIER |
|---|---|---|---|
| Agerite Geltrol | Liquid | 0.955–0.975 | Vanderbilt |
| Naugard 492 | Liquid | 1.008 | Uniroyal |
| Vanox 13 | Liquid | 0.93 | Vanderbilt |
| Vanox 1005 | Liquid | 0.955–0.975 | Vanderbilt |

-continued

E
PHOSPHITES AND PHOSPHITE BLENDS

| Vanox 1013 | Liquid | 0.93 | Vanderbilt |
|---|---|---|---|
| Wytox 604 | Liquid | 0.89–0.93 | Olin |
| Wytox 604-LMS | Liquid | 0.948 | Olin |
| Wytox 604-S (1) | Gray powder | | Olin |

(1) Solid form

F
THIOESTERS

6. Phosphite/phenolic antioxidant blends

| TRADE NAME | SUPPLIER |
|---|---|
| Irganox B215 (1) | CIBA-GEIGY |
| Irganox B225 (2) | CIBA-GEIGY |
| Irganox B900 (3) | CIBA-GEIGY |
| Irganox B1171 (4) | CIBA-GEIGY |
| Weston 800 (5) | Borg-Warner |
| Weston 801 (6) | Borg-Warner |
| Weston 802 (7) | Borg-Warner |

Blends of tris-(2,4-di-t-butylphenyl) phosphite and a phenolic antioxidant as follows:
(1) 2:1 Blend with tetrakis(methylene(3,5-di-t-butyl-4-hydroxy hydrocinnamate))-methane(C-2)
(2) 1:1 Blend with tetrakis(methylene(3,5-di-t-butyl-4-hydroxy hydrocinnamate))-methane(C-2)
(3) 4:1 Blend with octadecyl(3,5-di-t-butyl-4-hydroxybenzyl)phosphonate(G-1)
(4) 1:1 Blend with 1,6-hexamethylenebis-(3,5-di-t-butyl-4-hydroxy hydrocinnamide)(G-5)
Blends of distearyl pentaerythritol diphosphite(E-3) and tetrakis(methylene 3-(3,5-di-t-butyl-4-hydroxyphenyl)propionate)methane as follows:
(5) 1:1 Blend
(6) 2:1 Blend
(7) 3:1 Blend 1. Dilauryl thiodipropionate or Didodecyl 3,3'-thiodipropionate

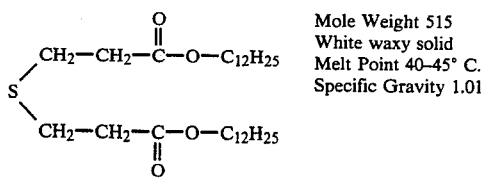

Mole Weight 515
White waxy solid
Melt Point 40–45° C.
Specific Gravity 1.01

Antioxidant for polyolefins and other plastics.

| TRADE NAME | SUPPLIER |
|---|---|
| Argus DLTDP | Argus |
| Carstab DLTDP | Carstab |
| Cyanox LTDP | Cyanamid |
| Evanstab 12 | Evans |
| Lowinox DLTDP | Lowi |
| Nonox DLTDP | ICI |

2. Distearyl thiodipropionate or Dioctadecyl 3,3'-thiodipropionate

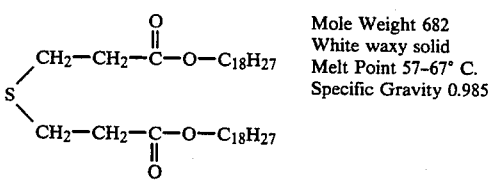

Mole Weight 682
White waxy solid
Melt Point 57–67° C.
Specific Gravity 0.985

Antioxidant for polyolefins and other plastics.

| TRADE NAME | SUPPLIER |
|---|---|
| Argus DSTDP | Argus |
| Carstab DSTDP | Carstab |
| Cyanox STDP | Cyanamid |
| Evanstab 18 | Evans |

-continued

F
THIOESTERS

| Nonox DSTDP | ICI |
|---|---|

3. Dimyristyl thiodipropionate

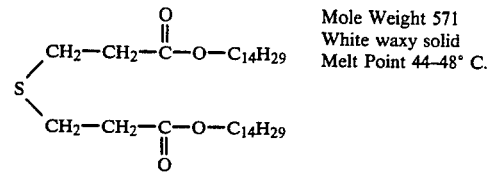

Mole Weight 571
White waxy solid
Melt Point 44–48° C.

Antioxidant for polyolefins and other plastics.

| TRADE NAME | SUPPLIER |
|---|---|
| Argus DMTDP | Argus |
| Carstab DMTDP | Carstab |
| CYanox MTDP | Cyanamid |
| Evanstab 14 | Evans |

4. Ditridecyl thiodipropionate

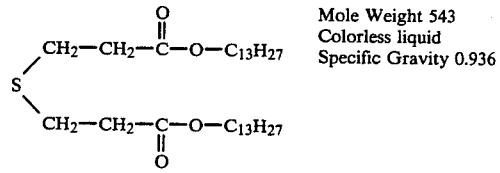

Mole Weight 543
Colorless liquid
Specific Gravity 0.936

| TRADE NAME | SUPPLIER |
|---|---|
| Argus DTDTDP | Argus |
| Cyanox 711 | Cyanamid |
| Evanstab 13 | Evans |

5. Mixed esters(lauryl and stearyl) of thiodipropionic acid

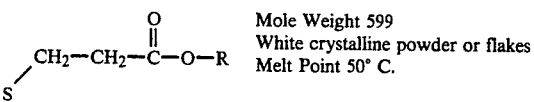

Mole Weight 599
White crystalline powder or flakes
Melt Point 50° C.

| TRADE NAME | SUPPLIER |
|---|---|
| Cyanox 1212 | Cyanamid |

6. Pentaerythritol tetrakis(3-(dodecylthio)propionate)

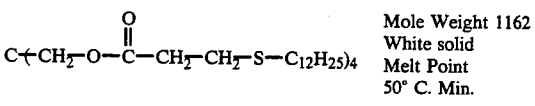

Mole Weight 1162
White solid
Melt Point 50° C. Min.

Antioxidant for polyolefins and other plastics.

| TRADE NAME | SUPPLIER |
|---|---|
| Seenox 412-S | Argus |

7. Blend of a phenolic and thioester type antioxidant.

White powder
Specific Gravity 1.04, 1.76 (1)

Antioxidant systems for polyolefins.

| TRADE NAME | SUPPLIER |
|---|---|
| Vanox 1030 | Vanderbilt |
| Vanox 1040 (1) | Vanderbilt |

(1) Contains a mineral deactivator for mineral filled compounds.

G
MULTIFUNCTIONAL NON-STAINING ANTIOXIDANTS

1. O,O—Di-n-octadecyl(3,5-di-t-butyl-4-hydroxybenzyl)phosphonate

G
MULTIFUNCTIONAL NON-STAINING ANTIOXIDANTS

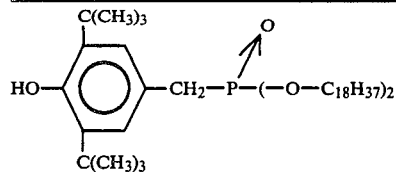

| | |
|---|---|
| | Mole Weight 805 |
| | White crystalline powder |
| | Melt Point 45° C. Min. |
| | Specific Gravity 0.96 |

Antioxidant, stabilizer for plastics.

| TRADE NAME | SUPPLIER |
|---|---|
| Irganox 1093 | CIBA-GEIGY |

2. 1,6-Hexamethylene bis(3,5-di-t-butyl-4-hydroxyhydrocinnamate)
   1,6-Hexamethylene bis(3-(3,5-di-t-butyl-4-hydroxyphenyl)propionate)

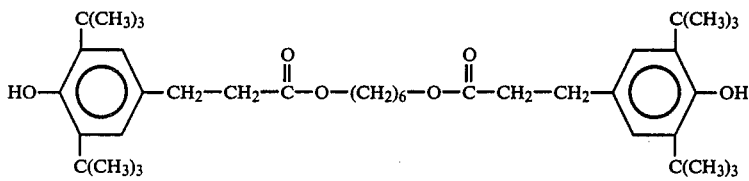

| | |
|---|---|
| | Mole Weight 639 |
| | Off-white crystalline powder |
| | Melt Point 94–108° C. |

General purpose antioxidant for plastics and elastomers.

| TRADE NAME | SUPPLIER |
|---|---|
| Irganox 259 | CIBA-GEIGY |

3. Thiodiethylene bis(3,5-di-t-butyl-4-hydroxy)hydrocinnamate or
   Thiodiethylene bis(3-(3,5-di-t-butyl-4-hydroxyphenyl)propionate)

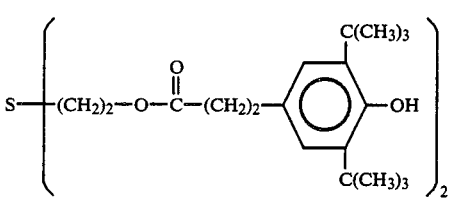

| | |
|---|---|
| | Mole Weight 642 |
| | White crystalline powder |
| | Melt Point 63° C. Min. |
| | Specific Gravity 1.19 |

Antioxidant for plastic and elastomers.

| TRADE NAME | SUPPLIER |
|---|---|
| Irganox 1035 | CIBA-GEIGY |

4. Octadecyl 3-(3,5-di-t-butyl-4-hydroxyphenyl)propionate or
   Octadecyl 3,5-di-t-butyl-4-hydroxyhydrocinnamate

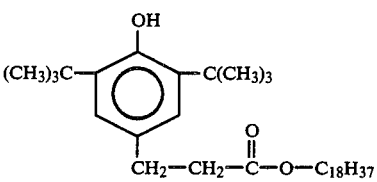

| | |
|---|---|
| | Mole Weight 531 |
| | White crystalline powder |
| | Specific Gravity 1.02 |
| | Melt Point 49–54° C. |

Antioxidants for plastics and elastomers.

| TRADE NAME | SUPPLIER |
|---|---|
| Irganox 1076 | CIBA-GEIGY |

5. N,N'—Hexamethylene bis(3,5-di-t-butyl-4-hydroxyhydrocinnamamide) or
   N,N'—Hexamethylene bis(3-(3,5-di-t-butyl-4-hydroxyphenyl)propionamide)

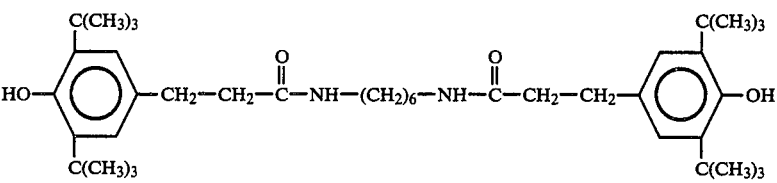

| | |
|---|---|
| | Mole Weight 637 |
| | White crystalline powder |
| | Specific Gravity 1.05 |
| | Melt Point 156–162° C. |

Antioxidants for polyamides, plastics and elastomers.

| TRADE NAME | SUPPLIER |
|---|---|
| Irganox 1098 | CIBA-GEIGY |

G
MULTIFUNCTIONAL NON-STAINING ANTIOXIDANTS 6. 3,5-Di-t-butyl-4-hydroxyhydrocinnamic acid triester with 1,3,5-Tris(2-hydroxyethyl)-s-triazine-2,4,6-(1H,3H,5H)trione

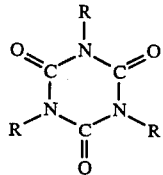 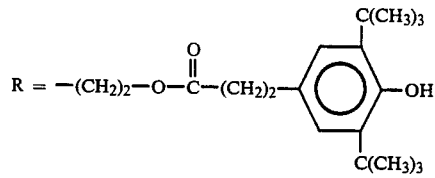

Mole Weight 1042
White crystalline powder
Specific Gravity 0.921
Melt Point 123–131° C.

Antioxidant for plastics.

| TRADE NAME | SUPPLIER |
|---|---|
| Good-rite 3125 | Goodrich |
| Agerite SKT, Vanox SKT | Vanderbilt |

7. N—Butyryl-p-aminophenol or N—(4-Hydroxyphenyl)butyramide

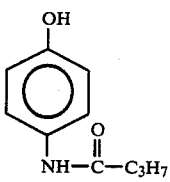

Mole Weight 179
White powder
Melt Point 136–141° C.

Antioxidants for plastics and elastomers.

| TRADE NAME | SUPPLIER |
|---|---|
| Suconox 4 | Hexel |

8. N—Pelargonoyl-p-aminophenol or N—(4-Hydroxyphenyl)pelargonamide

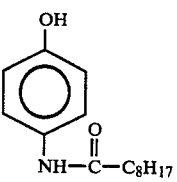

Mole Weight 249
White powder
Melt Point 121–125° C.

Antioxidant for plastics and elastomers.

| TRADE NAME | SUPPLIER |
|---|---|
| Suconox 9 | Hexel |

9. N—Lauroyl-p-aminophenol or N—(4-Hydroxyphenyl)dodecanamide

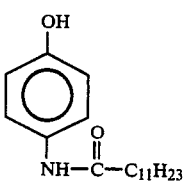

Mole Weight 291
White powder
Melt Point 130–134° C.

Antioxidant for plastics, butyl rubber and elastomers.

| TRADE NAME | SUPPLIER |
|---|---|
| Suconox 12 | Hexel |

10. N—Stearoyl-p-aminophenol or N—(4-Hydroxyphenyl)stearamide

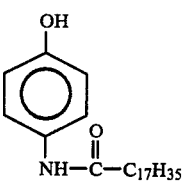

Mole Weight 376
White powder
Melt Point 130–134° C.

Antioxidant for polyethylene and polyamides.

G
MULTIFUNCTIONAL NON-STAINING ANTIOXIDANTS

| TRADE NAME | SUPPLIER |
|---|---|
| Suconox 18 | Hexel |

11. 2,6-Di-t-butyl-alpha-dimethylamino-p-cresol or 2,6-Di-t-butyl-4-(dimethylaminomethyl)phenol

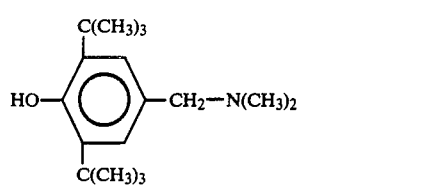

Mole Weight 263
Light yellow crystalline powder
Melt Point 94° C.

Antioxidant for plastics and elastomers.

| TRADE NAME | SUPPLIER |
|---|---|
| Ethyl Antioxidant 703 | Ethyl |

12. 1,3,5-Tris(4-t-butyl-3-hydroxy-2,6-dimethylbenzyl)-s-triazine-2,4,6-(1H,3H,5H)trione

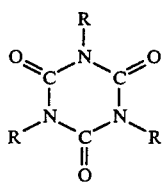     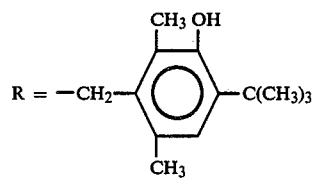

Mole Weight 699
Off-white powder
Melt Point 145–155° C.

| TRADE NAME | SUPPLIER |
|---|---|
| Cyanox 1790 | Cyanamid |

13. Nickel bis(O—ethyl(3,5-di-t-butyl-4-hydroxybenzyl)phosphonate)

Mole Weight 714
Tan-light green powder
Melt Point 180° C. Min.

Antioxidant/UV absorber for plastics.

| TRADE NAME | SUPPLIER |
|---|---|
| Irgastab 2002 | CIBA-GEIGY |

14. 2,2'-Oxamidobisethyl 3-(3,5-di-t-butyl-4-hydroxyphenyl)propionate

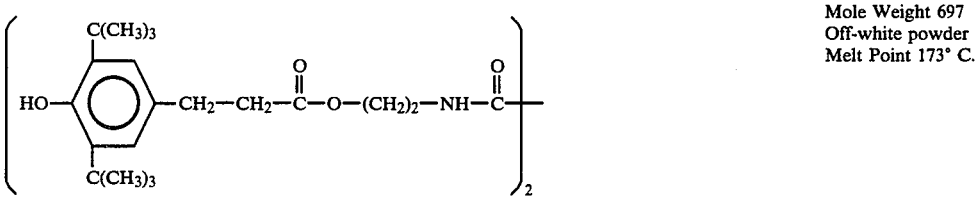

Mole Weight 697
Off-white powder
Melt Point 173° C.

Antioxidant and metal deactivator.

| TRADE NAME | SUPPLIER |
|---|---|
| Naugard XL-1 | Uniroyal |

15. Phenolic antioxidant/metal deactivator - undisclosed composition.

| TRADE NAME | SPECIFIC GRAVITY | MELT POINT | SUPPLIER |
|---|---|---|---|
| Irganox MD-1024 | 1.12 | 224° C. Min. | CIBA-GEIGY |

16. Tris(2-t-butyl-4-(2-methyl-4-hydroxy-5-t-butylphenylthio)-5-methyl)phenylphosphite

G
MULTIFUNCTIONAL NON-STAINING ANTIOXIDANTS

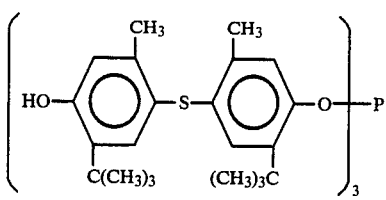

Mole Weight 1103

Antioxidant and metal deactivator

| TRADE NAME | PHYS FORM | SPECIFIC GRAVITY | SUPPLIER |
|---|---|---|---|
| Antioxidant VP OSP 1 | White powder | 1.10 | Hoechst |

17. Bis(3,3-bis(4-hydroxy-3-t-butylphenyl)butanoic acid)glycolester

Mole Weight 795
Melt Point 170° C.

| TRADE NAME | PHYS FORM | SPECIFIC GRAVITY | SUPPLIER |
|---|---|---|---|
| Hostanox 03 | White powder | 1.1 | Hoechst |

18. Tetrakis(2,4-di-t-butylphenyl)4,4'-biphenylylenediphosphonite

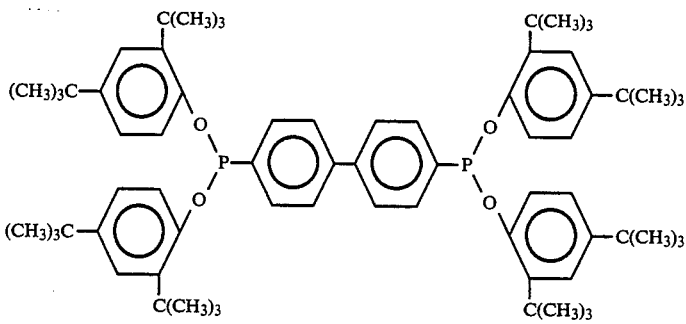

Mole Weight 1035

| TRADE NAME | PHYS FORM | SPECIFIC GRAVITY | SUPPLIER |
|---|---|---|---|
| Sandostab P-EPQ | 75° C. | 1.045 | Sandoz |

19. n-Propyl gallate or n-Propyl 3,4,5-tri-hydroxybenzoate

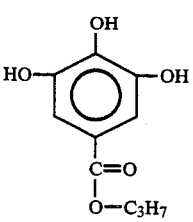

Mole Weight 212
White powder
Melt Point 146–148° C.

| TRADE NAME | SUPPLIER |
|---|---|
| Tenox PG | Eastman |

20. Calcium bis(O—ethyl(3,5-di-t-butyl-4-hydroxybenzyl)phosphonate)

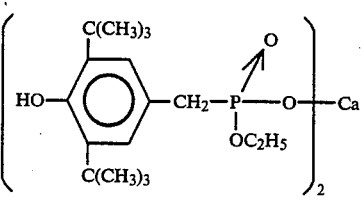

Mole Weight 647
Off-white powder
Melt Point >260° C.

Antioxidant/metal deactivator

| TRADE NAME | SUPPLIER |
|---|---|
| Irganox 1425 | CIBA-GEIGY |

21. Phenolic Antioxidant - composition undisclosed.
Antioxidant/metal deactivator.

G
MULTIFUNCTIONAL NON-STAINING ANTIOXIDANTS

| TRADE NAME | PHYSICAL FORM | SUPPLIER |
|---|---|---|
| Lowinox 22CP46-MD | Off-white powder | Lowi |

H
MISCELLANEOUS UNCLASSIFIED NON-STAINING ANTIOXIDANTS AND BLENDS

1. 1,2-Mercapto-4(5)-methylbenzimidazole

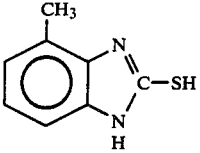

Mole Weight 164
Yellow-white powder
Specific Gravity 1.25
Melt Point 270° C.

and

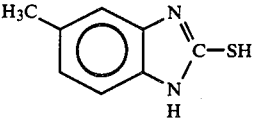

Antioxidant, synergist and metal deactivator.

| TRADE NAME | SUPPLIER |
|---|---|
| Vulkanox MB-2/MG | Mobay |

2. Zinc salt of 2-mercaptobenzimidazole

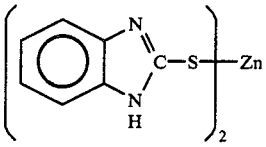

White powder
Specific Gravity 1.75
Melt Point > 300° C.
with decomposition.

Antioxidant and synergist.

| TRADE NAME | SUPPLIER |
|---|---|
| Akrochem Antioxidant 58 | Akron Chemical |
| Naugard ZMB | Uniroyal |

3. 2-Mercapto-4-methylbenzimidazole, zinc salt, 2-Mercapto-5-methylbenzimidazole, zinc salt

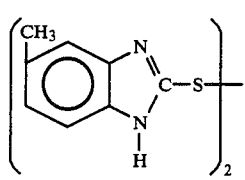

Mole Weight 392

| TRADE NAME | SPECIFIC GRAVITY | MELT POINT | SUPPLIER |
|---|---|---|---|
| Vulkanox ZMB-2/C | 1.75 | >300° C. | Mobay |

4. Antioxidants of undisclosed composition, including blends.

| TRADE NAME | PHYS FORM | SUPPLIER |
|---|---|---|
| Mark 1220 | Yellow liquid | Argus |
| Mark 1475 (1) | White powder | Argus |
| Mark 2112 | White powder | Argus |
| Mark 2183 (1) | Tan powder | Argus |

(1) Antioxidant/chelator.

5. Phosphite/phenolic antioxidant blends

| TRADE NAME | PHYS FORM | SPECIFIC GRAVITY | SUPPLIER |
|---|---|---|---|
| Mark 1409 | Liquid | 0.99 | Argus |
| Mark 1409-S (1) | Granules | 1.18 | Argus |

(1) Solid form of Mark 1409

6. Thioester/phenolic antioxidant blends

General purpose antioxidants used mainly in plastics.

| TRADE NAME | PHYS FORM | SPECIFIC GRAVITY | SUPPLIER |
|---|---|---|---|
| Mark 158 | Yellow liquid | 0.982 | Argus |
| Mark 1589 | White powder | 1.17 | Argus |
| Mark 1589B | White powder | 1.17 | Argus |

7. 2-Mercaptotoluimidazole

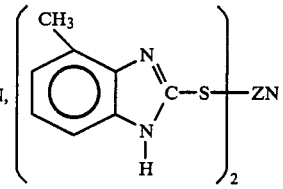

Mole Weight 164
Melt Point 250° C. Min.

Non-staining antioxidant and synergist.

| TRADE NAME | PHYS FORM | SPECIFIC GRAVITY | SUPPLIER |
|---|---|---|---|
| Vanox MTI | Tan powder | 1.33 | Vanderbilt |

8. Zinc 2-mercaptotoluimidazole

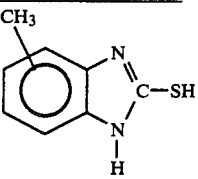

Mole Weight 391

Non-staining antioxidant and synergist.

| TRADE NAME | PHYS FORM | SPECIFIC GRAVITY | SUPPLIER |
|---|---|---|---|
| Vanox ZMTI | Tan powder Melt Point > 300° C. | 1.69 | Vanderbilt |

9. Dioctadecyl disulfide $$H_{38}C_{18}-S-S-C_{18}H_{38}$$

Mole Weight 571
Melt Point 53–58° C.

| TRADE NAME | PHYS FORM | SPECIFIC GRAVITY | SUPPLIER |
|---|---|---|---|
| Antioxidant SE10 | White powder | 0.85@55° C. | Hoechst |

10. Blends including a phenolic antioxidant-undisclosed composition.

| TRADE NAME | SPECIFIC GRAVITY | MELT POINT | SUPPLIER |
|---|---|---|---|
| Antioxidant AO-19 | 1.03 | 110–200° C. | Sovereign |
| Antioxidant 35 Powder | 1.04 | 105–115° C. | Sovereign |
| Antioxidant 872 | 1.03 | 122° C. | Sovereign |

11. Blend of non-staining antioxidants

| TRADE NAME | PHYS FORM | SPECIFIC GRAVITY | SUPPLIER |
|---|---|---|---|
| Permanax CNS | Cream powder Melt Point 298° C. | 1.25 | Vulnaz |

12. Metal aromatic sulfonate

H
MISCELLANEOUS UNCLASSIFIED NON-STAINING ANTIOXIDANTS AND BLENDS

Mineral deactivator.

| TRADE NAME | PHYS FORM | SPECIFIC GRAVITY | SUPPLIER |
|---|---|---|---|
| Vanox 3240 | Brown liquid | 0.98 | Vanderbilt |
| Vanox 3245 | Brown flake | 1.12 | Vanderbilt |

I
NAPHTHYLAMINES

1. N—Phenyl-alpha-naphthylamine

Mole Weight 219
Tan-purple powder
Melt point 50–59° C.
Specific Gravity 1.16–1.20

| TRADE NAME | SUPPLIER |
|---|---|
| Additin 30 | Mobay |
| Akrochem Antioxidant PANA | Akron Chemical |
| Naugard PAN | Uniroyal |

2. N—Phenyl-beta-naphthylamine (Commonly called 'PBNA')

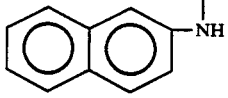

Mole Weight 219
Dark Solid
Melt Point 105–106° C.
Specific Gravity 1.18–1.24

Powerful staining antioxidant exstensively used in Europe.
No known suppliers in the USA.

J
DIPHENYLAMINE AND OTHER DIARYLAMINE DERIVATIVES 1. p-Oriented styrenated diphenylamine

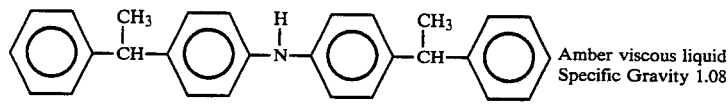

Amber viscous liquid
Specific Gravity 1.08

Mostly di substituted with some mono and tri substituted species.
Some ortho substitution.
Highly active non-staining, mildly discoloring amine for natural and synthetic polymers and compounds.

| TRADE NAME | SUPPLIER |
|---|---|
| WINGSTAY 29 | GOODYEAR |
| WINGSTAY 29 Powder (1) | GOODYEAR |
| Lowinox SDA (2) | Lowi |
| Vulkanox DDA (2) | Mobay |

(1) Solid form of WINGSTAY 29 - 70% active - Specific Gravity 1.53
(2) Orientation and amount of styrenation not listed.

2. Octylated diphenylamines

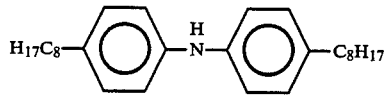

General purpose semi-staining antioxidants for polymers and compounds

| TRADE NAME | PHYS FORM | MELT POINT | SPECIFIC GRAVITY | SUPPLIER |
|---|---|---|---|---|
| Agerite Gel (1) | Tan waxy solid | 40–50° C. | 0.94 | Vanderbilt |
| Agerite Stalite S | Tan powder | 89–103° C. | 1.02 | Vanderbilt |
| Akrochem Antiox S | Brown granules | 88° C. Min. | 1.00 | Akron Chemical |
| Cyanox 8 | Gray flakes | 75–85° C. | 0.98 | Cyanamid |
| Flectol ODP | Tan powder | 89–103° C. | 0.99 | Monsanto |
| Octamine | Tan solid | 85° C. Min. | 0.99 | Uniroyal |
| Pennox ODP | Tan powder | 88–98° C. | 1.02 | Pennwalt |
| Permanax OD | Tan granules | 90° C. | 1.12 | Vulnax |
| Vanox 12 | Tan granules | 94–100° C. | 1.01 | Vanderbilt |
| Vanox 1081 | Tan granules | 94–100° C. | 1.02 | Vanderbilt |
| Vulkanox OCD | Tan granules | 90° C. | 1.12 | Mobay |

(1) Contains 25% wax

3. Other alkylated diphenylamines

J
DIPHENYLAMINE AND OTHER DIARYLAMINE DERIVATIVES

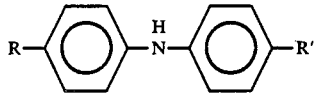

General purpose semi-staining antioxidants.

| TRADE NAME | PHYS FORM | SPECIFIC GRAVITY | SUPPLIER |
|---|---|---|---|
| Agerite NEPA (1) | Amber liquid | 0.935 | Vanderbilt |
| Agerite Stalite (2) | Dark liquid | 1.01 | Vanderbilt |
| Pennox A (2) | Dark liquid | 0.995–1.025 | Pennwalt |
| Permanax HD (3) | Brown liquid | 0.97 | Vulnax |
| Permanax HD(SE) (4) | Brown liquid | 0.97 | Vulnax |
| Polylite (5) | Dark liquid | 0.95 | Uniroyal |
| Vanox 1001 (1) | Amber liquid | 0.935 | Vanderbilt |
| Wytox ADP-F (1) | Gray flake | 0.99 | Olin |

(1) Alkylation not specified
(2) Octylated
(3) Heptylated
(4) Self emulsifying form
(5) Nonylated 4. High temperature reaction products of diphenylamine and acetone
Powerful amine antioxidants for rubber compounds used frequently to impart high temperature resistance. Rather severe staining

| TRADE NAME | PHYS FORM | SPECIFIC GRAVITY | SUPPLIER |
|---|---|---|---|
| Agerite Superflex (1) | Dark liquid | 1.10 | Vanderbilt |
| Agerite Superflex Solid G (3) | Dk br powder | 1.33 | Vanderbilt |
| Agerite Superflex Solid Rodform (2) | Dk brown rods | 1.34 | Vanderbilt |
| BLE-25 | Dark br liquid | 1.10 | Uniroyal |
| BLE-75 | Dk br powder | 1.33 | Uniroyal |
| Permanax BL | Brown liquid | 1.09–1.10 | Vulnax |
| Permanax BLN | Brown liquid | 1.09–1.10 | Vulnax |
| Permanax BLW (5) | Brown solid | 1.26 | Vulnax |

(1) Contains 20% diphenylamine
(2) 32.5% Inert carrier
(3) 15% Diphenylamine, 25% inert carrier
(4) 75% Active on micro-cel
(5) Contains a silicate carrier 5. Low temperature reaction product of diphenylamine and acetone Brown-green powder
Specific Gravity 1.15
General purpose antioxidant.

| TRADE NAME | MELT POINT | SUPPLIER |
|---|---|---|
| Aminox | 85–95° C. | Uniroyal |
| Permanax B | 75–90° C. | Vulnax |

6. Diarylamine/ketone/aldehyde reaction products

Dark brown solids
Melt Point 85–95° C.
Specific Gravity 1.15
General purpose antioxidants.

| TRADE NAME | SUPPLIER |
|---|---|
| BXA-G | Uniroyal |
| Naugard BG | Uniroyal |
| Vanox AT | Vanderbilt |

7. Substituted diphenylamine-structure not revealed

Off-white powder
Melt point 96–99° C.
Specific Gravity 1.14
Non-discoloring amine antioxidant for polymers and plastics.

| TRADE NAME | SUPPLIER |
|---|---|
| Naugard 445 | Uniroyal |

K
p-PHENYLENEDIAMINES

1. N—Phenyl-N'—(1,3-dimethylbutyl)p-phenylenediamine

K
p-PHENYLENEDIAMINES

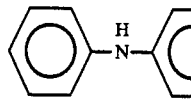

Mole Weight 268
Gray-black solid or semi-solid
Melt Point 45–50° C.
Specific Gravity 1.02

Powerful and persistent antioxidant, flex crack inhibitor and antiozonant.

| TRADE NAME | SUPPLIER |
|---|---|
| WINGSTAY 300 | GOODYEAR |
| Akrochem Antiozonant PD #2 | Akron Chem |
| Anto 3E | Pennwalt |
| Antozite 67 | Vanderbilt |
| Antozite 67F (1) | Vanderbilt |
| Flexzone 7F, (1) | Uniroyal |
| Flexzone 7L | Uniroyal |
| Permanax 6PPD | Vulnax |
| Santoflex 13 | Monsanto |
| Santoflex 13F, (1) | Monsanto |
| UOP 588 | UOP |
| Vulkanox 4020 | Mobay |
| Vulkanox 4020 Flake (1) | Mobay |

(1) Flaked form

2. N—Phenyl-N'—isopropyl-p-phenylenediamine

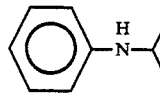

Mole Weight 226
Purple black flakes
Melt Point 70–77° C.
Specific Gravity 1.14–1.17

Powerful antioxidant-antiozonant.

| TRADE NAME | SUPPLIER |
|---|---|
| Akrochem Antiozonant PD #1 | Akron Chem |
| Anto 3H | Pennwalt |
| Flexzone 3C | Uniroyal |
| Permanax IPPD | Vulnax |
| Santoflex IP | Monsanto |
| Vulkanox 4010NA | Mobay |

3. N—Phenyl-N'—(1-methylheptyl)-p-phenylenediamine

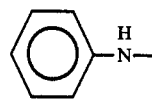

Mole Weight 296
Dark brown liquid
Specific Gravity 1.00

Antioxidant-antiozonant.

| TRADE NAME | SUPPLIER |
|---|---|
| UOP 688 | UOP |

4. N—Phenyl-N'—cyclohexyl-p-phenylenediamine

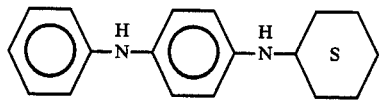

Mole Weight 266
Gray-violet flakes
Melt Point 103–107° C.
Specific Gravity 1.29

Antioxidant-antiozonant.

| TRADE NAME | SUPPLIER |
|---|---|
| Flexzone 6H | Uniroyal |

5. Mixed diaryl-p-phenylenediamines

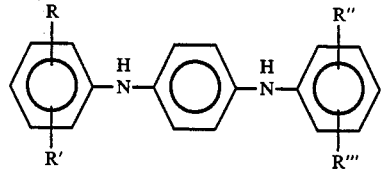

R, R', R", and R'''
may be H or CH$_3$

K
p-PHENYLENEDIAMINES

Persistent antioxidants, antiozonants and antiflex agents for many natural and synthetic rubber compounds. Very powerful antiozonants for CR. Very non-volatile and slow to extract.

| TRADE NAME | PHYSICAL FORM | MELT POINT | SPECIFIC GRAVITY | SUPPLIER |
|---|---|---|---|---|
| WINGSTAY 100 | Silver-gray flakes | 90–105° C. | 1.18 | GOODYEAR |
| WINGSTAY 100AZ (1) | Gray flakes | 110° C. | 1.18 | GOODYEAR |
| WINGSTAY 200 | Low-melting semi-solid | 60° C. | 1.18 | GOODYEAR |

(1) Special low scorch grade for neoprene (CR)

6. N,N'—Diphenyl-p-phenylenediamine

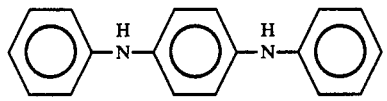

Mole Weight 260
Gray flakes
Melt Point 136° C.
Specific Gravity 1.21

General purpose antioxidant and flex crack inhibitor. Limited solubility in most polymers.

| TRADE NAME | SUPPLIER |
|---|---|
| Agerite DPPD | Vanderbilt |
| J-Z-F | Uniroyal |
| Naugard J | Uniroyal |
| Permanax DPPD | Vulnax |

7. N,N'—Di-beta-naphthyl-p-phenylenediamine

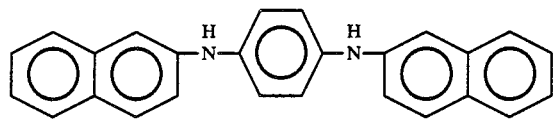

Mole Weight 360
Gray to tan powder
Melt Point 224–230° C.
Specific Gravity 1.25

Antioxidant and metal deactivator. Not an antiozonant.

| TRADE NAME | SUPPLIER |
|---|---|
| Agerite White | Vanderbilt |
| Agerite White White (1) | Vanderbilt |

(1) Special grade

8. N,N'—Bis(1,4-dimethylpentyl)-p-phenylenediamine

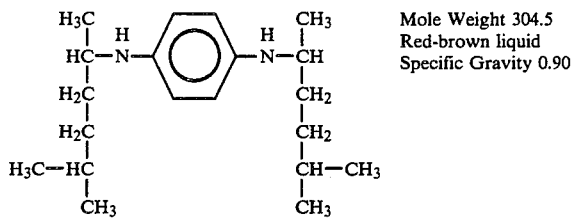

Mole Weight 304.5
Red-brown liquid
Specific Gravity 0.90

General purpose antiozonant. Activates cure systems.

| TRADE NAME | SUPPLIER |
|---|---|
| Flexzone 4L | Uniroyal |
| Santoflex 77 | Monsanto |
| UOP 788 | UOP |

9. N,N'—Bis(1-ethyl-3-methylpentyl)-p-phenylenediamine

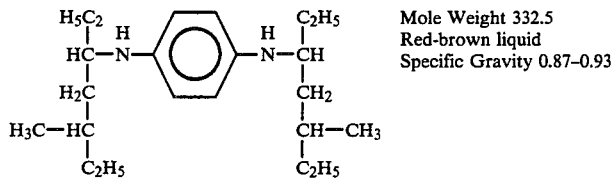

Mole Weight 332.5
Red-brown liquid
Specific Gravity 0.87–0.93

General purpose antiozonant. Activates cure systems.

| TRADE NAME | SUPPLIER |
|---|---|
| Antozite 2 | Vanderbilt |
| Flexzone 8L | Uniroyal |

-continued

K
p-PHENYLENEDIAMINES

| UOP 88 | UOP |
|---|---|

10. N,N'—Bis(1-methylheptyl)-p-phenylenediamine

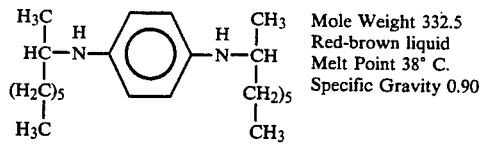

Mole Weight 332.5
Red-brown liquid
Melt Point 38° C.
Specific Gravity 0.90

General purpose antiozonant. Activates cure systems.

| TRADE NAME | SUPPLIER |
|---|---|
| Antozite 1 | Vanderbilt |
| Santoflex 217 | Monsanto |
| UOP 288 | UOP |

11. N—Phenyl-N'-(p-toluenesulfonyl)-p-phenylenediamine

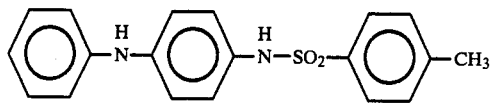

Mole Weight 324
Gray powder
Melt Point 146° C. Min.
Specific Gravity 1.35

Semi-discoloring antioxidant and copper inhibitor.

| TRADE NAME | SUPPLIER |
|---|---|
| Aranox | Uniroyal |

L
QUINOLINES

1. Polymerized 2,2,4-trimethyl-1,2-dihydroquinoline

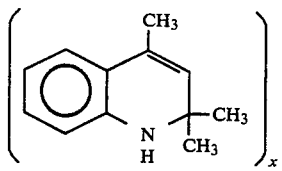

General purpose semi-staining antioxidant used in dry rubber and latex compounding. Used to impart high temperature resistance. Functions As a mild antiozonant. Specific Gravity 1.04–1.08

| TRADE NAME | PHYS FORM | MELT POINT | SUPPLIER |
|---|---|---|---|
| Agerite MA | Tan powder | 74° C. Min. | Vanderbilt |
| Agerite ME Pellets | Tan pellets | 74° C. Min. | Vanderbilt |
| Agerite PE Pellets | Amber pellets | 88° C. Min. | Vanderbilt |
| Agerite Resin D | Amber pellets | 74° C. Min. | Vanderbilt |
| Agerite Resin D Powder | Amber powder | 74° C. Min. | Vanderbilt |
| Akrochem Antioxidant DQ | Amber powder | 75° C. Min. | Akron Chemical |
| Cyanox 12 | Tan powder or flakes | 75–110° C. | Cyanamid |
| Flectol H | Tan powder | 75–110° C. | Monsanto |
| Lowinox ACP | | | Lowi |
| Naugard Q | Amber powder | 75° C. Min. | Uniroyal |
| Pennox HR Flake | Tan flake | 75–110° C. | Pennwalt |
| Pennox HR Powder | Tan powder | 75–110° C. | Pennwalt |
| Permanax TQ | Brown flake | 79° C. Min. | Vulnax |
| Vulkanox HS | Amber pellets | 75° C. | Mobay |

2. 6-Dodecyl-2,2,4-trimethyl-1,2-dihydroquinoline

-continued

L
QUINOLINES

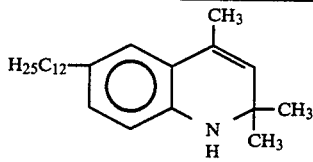

Mole Weight 342

General purpose antioxidant.

| TRADE NAME | PHYS FORM | SPECIFIC GRAVITY | SUPPLIER |
|---|---|---|---|
| Santoflex DD | Dark liquid | 0.90–0.96 | Monsanto |

3. 6-Ethoxy-2,2,4-trimethyl-1,2-dihydroquinoline

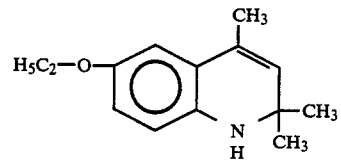

Mole Weight 217

Highly staining antioxidant and antiozonant.

| TRADE NAME | PHYS FORM | SPECIFIC GRAVITY | SUPPLIER |
|---|---|---|---|
| Santoflex AW | Dark liquid | 1.02–1.05 | Monsanto |
| Vulkanox EC | Dark liquid | 1.02–1.05 | Mobay |

M
BLENDED AMINES

1. 65% Dioctylated diphenylamine (J-2) and 35% N,N'—diphenyl-p-phenylenediamine (K-6)

Antioxidant and flex cracking inhibitor.

Melt Point 80–100° C.

| TRADE NAME | PHYS FORM | SPECIFIC GRAVITY | SUPPLIER |
|---|---|---|---|
| Agerite HP-S | Black powder | 1.11 | Vanderbilt |

M
BLENDED AMINES

| | | | |
|---|---|---|---|
| Agerite HP-S Rodform | Black Rodform | 1.11 | Vanderbilt |

2. 50% Octylated diphenylamine (J-2), 25% N,N'—diphenyl-p-phenylenediamine (K-6) and 25% high temperature reaction product of diphenylamine and acetone. (J-4)

Antioxidant and flex cracking inhibitor.

Melt Point 70° C. Min.

| TRADE NAME | PHYS FORM | SPECIFIC GRAVITY | SUPPLIER |
|---|---|---|---|
| Agerite Hipar T | Brown powder | 1.15 | Vanderbilt |

3. 65% Diarylamine/ketone reaction product and 35% N,N'—diphenyl-p-phenylenediamine (K-6)

Antioxidant, flex cracking inhibitor and metal deactivator.

Melt Point 87–99° C.

| TRADE NAME | PHYS FORM | SPECIFIC GRAVITY | SUPPLIER |
|---|---|---|---|
| Flexamine | Brown powder | 1.17 | Uniroyal |
| Flexamine G | Brown granules | 1.17 | Uniroyal |

4. p-Phenylenediamine antiozonant blends-undisclosed composition.

| TRADE NAME | PHYS FORM | SUPPLIER |
|---|---|---|
| Flexzone 10L | Dark liquid | Uniroyal |
| Flexzone 11L | Dark liquid | Uniroyal |
| Flexzone 12L | Dark liquid | Uniroyal |
| Flexzone 15L | Dark liquid | Uniroyal |
| Santoflex 134 | Dark liquid | Monsanto |
| UOP 57 (1) | Dark liquid | UOP |
| UOP 62 (2) | Dark liquid | UOP |
| UOP 256 (3) | Dark liquid | UOP |

(1) Blend of UOP 588 and UOP 788
(2) Blend of UOP 288 and UOP 688
(3) Blend of UOP 288, UOP 588 and UOP 688

5. Blend of 50% N,N'—bis(1,4-dimethylpentyl)-p-phenylenediamine (K-8) and 50% N—phenyl-N'—(1,3-dimethylbutyl)-p-phenylenediamine (K-1)

General purpose antiozonant blend.

| TRADE NAME | PHYS FORM | SUPPLIER |
|---|---|---|
| Flexzone 9L | Dark liquid | Uniroyal |

6. Antidegradant blends-undisclosed composition.

General purpose antidegradant which may or may not be an antiozonant.

| TRADE NAME | PHYS FORM | SPECIFIC GRAVITY | SUPPLIER |
|---|---|---|---|
| Naugard 477 | Brown powder | 1.18 | Uniroyal |
| Permanax CR | Brown granules | 1.14 | Vulnax |

7. Antidegradant blends

General purpose antidegradants.

| TRADE NAME | PHYS FORM | SPECIFIC GRAVITY | SUPPLIER |
|---|---|---|---|
| Santoflex LC (1) | Dark liquid | 1.023 | Monsanto |
| Santoflex 134D (2) | Dark liquid | 0.96 | Monsanto |
| Santoflex 715 (3) | Dark liquid | 0.98 | Monsanto |

(1) 1 Part N—(1,3-dimethylbutyl)-N'—phenyl-p-phenylenediamine (K-1), 1 part N—(1,4-dimethylpentyl)-N'—phenyl-p-phenylenediamine and 4 parts 6-ethoxy-2,2,4-trimethyl-1,2-dihydroquinoline (L-3)
(2) 16⅔% N—(1,3-Dimethylbutyl)-N'—phenyl-p-phenylenediamine (K-1), 33⅓% N—(1,4-dimethylpentyl)-N'—phenyl-p-phenylenediamine and 50% 6-dodecyl-2,2,4-trimethyl-1,2 dihydroquinoline (L-2)
(3) 42% N—(1,3-Dimethylbutyl)-N'—phenyl-p-phenylenediamine (K-1), 42% N—(1,4-dimethylpentyl)-N'—phenyl-p-phenylenediamine and 16% N,N'—bis(1,4-dimethylpentyl)-p-phenylenediamine (K-8)

8. Mixture of an alkylated mercaptobenzimidazole and an amine antioxidant

| TRADE NAME | PHYS FORM | SPECIFIC GRAVITY | SUPPLIER |
|---|---|---|---|
| Stangard 500 | Tan powder | 1.24 | Harwick |

9. Amine antioxidant blend-undisclosed composition

| TRADE NAME | PHYS FORM | SPECIFIC GRAVITY | SUPPLIER |
|---|---|---|---|
| Vanox 200 | Brown liquid | 1.13 | Vanderbilt |
| Vanox 200 Powder | Brown powder | 1.40 | Vanderbilt |

N
MISCELLANEOUS UNCLASSIFIED ANTIOXIDANTS AND ANTIOZONANTS

1. Nickel dibutyldithiocarbamate

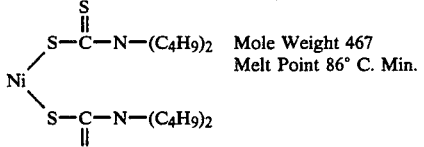

Mole Weight 467
Melt Point 86° C. Min.

Antiozonant for SBR and NBR antioxidant for several specialty polymers.

| TRADE NAME | PHYS FORM | SPECIFIC GRAVITY | SUPPLIER |
|---|---|---|---|
| Akrochem Nibud | Green solid | 1.27 | Akron Chemical |
| Naugard NBC | Green solid | 1.27 | Uniroyal |
| NBC | Green solid | 1.26 | duPont |
| Vanox NBC | Green solid | 1.27 | Vanderbilt |

2. Nickel diisobutyldithiocarbamate

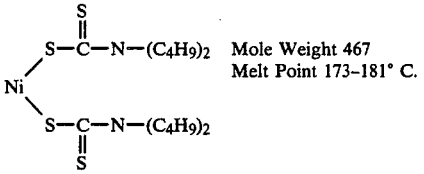

Mole Weight 467
Melt Point 173–181° C.

Antiozonant for SBR and NBR; antioxidant for several specialty polymers.

| TRADE NAME | PHYS FORM | SPECIFIC GRAVITY | SUPPLIER |
|---|---|---|---|
| Isobutyl Niclate | Green powder | 1.27 | Vanderbilt |

3. Nickel dimethyldithiocarbamate

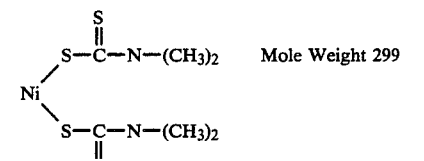

Mole Weight 299

Specialty antioxidant and antiozonant.

| TRADE NAME | PHYS FORM | SPECIFIC GRAVITY | SUPPLIER |
|---|---|---|---|
| Methyl Niclate | Green powder | 1.77 | Vanderbilt |

4. 3,9-Bis(3-cyclohexenyl)-2,4,8,10-tetraoxaspiro(5,5)undecane

Non-staining antiozonant.

| TRADE NAME | PHYS FORM | SPECIFIC GRAVITY | SUPPLIER |
|---|---|---|---|
| Vulkanox AFS/LG | Gray powder | 1.06 @ 90° C. | Mobay |

5. Unsaturated acetal absorbed on clay

Non-staining antiozonant.

| TRADE NAME | PHYS FORM | SPECIFIC GRAVITY | SUPPLIER |
|---|---|---|---|
| Akrochem Antiozonant E-9604 | Gray powder | 1.74 | Akron Chemical |

The preceding listing of antioxidants is taken from a trade publication entitled: *Index of Commercial Antioxidants & Antiozonants*, 3rd Edition (1982), distributed by the Goodyear Chemicals division of Goodyear Tire and Rubber Co., Akron, Ohio. That publication does not recommend any of the listed antioxidants specifically for inclusion in polyvinyl chloride compositions, and only recommends the following antioxidants:

N,N'-hexamethylene bis(3,5-di-t-butyl-4-hydroxyhydrocinnamamide);
N,N'-hexamethylene bis(3-(3,5-di-t-butyl-4-hydroxyphenyl)propionamide;
N-stearoyl-p-aminophenol; and
N-(4-hydroxyphenyl)stearamide;

specifically for inclusion in polyamides. (Many of the other listed antioxidants are recommended for inclusion in "plastics" without further definition of a composition.) This index does not suggest inclusion of antimicrobial materials in conjunction with the indicated antioxidants.

SUMMARY OF THE INVENTION

The essence of the present invention resides in the discovery that compositions and articles containing antimicrobial agents can be processed at relatively high temperatures, even when exposing a large surface area to the ambient atmosphere or other sources of oxygen (as when forming films or fibers), if the composition also contains an antioxidant (sometimes referred to herein as a "stabilizer"). Antioxidants have not previously been used to stabilize antimicrobial agents. Both the discovery of the nature of the oxidation problem and the discovery of its solution are facets of the present invention.

One aspect of the invention is an antimicrobial composition having improved resistance to degradation of antimicrobial activity as a result of exposure of said composition to heat. The composition comprises an antimicrobial agent and an antioxidant.

A second aspect of the invention is an unprocessed thermoplastic composition which will be resistant to microbial attack after being processed at an elevated temperature. This composition comprises a resin selected from the group consisting of polypropylene, polyamides, and polyvinyl chloride; an antimicrobial agent; and a amount of an antioxidant effective to reduce degradation of the antimicrobial agent while the composition is being melt processed.

A third aspect of the invention is an article, such as a film or fiber, having resistance to microbial attack. The article comprises a polymeric resin as described in the preceding paragraph, an antimicrobial agent, and an antioxidant. These components are combined to form a composition before the composition is melt processed to form the article.

Method aspects of the invention are also contemplated. One is a method for preserving the efficacy of an antimicrobial agent against heat-induced degradation, comprising the step of adding to the antimicrobial agent an effective amount of an antioxidant. Another is a method for melt processing a composition comprising a thermoplastic resin and an antimicrobial agent while maintaining the efficacy of the antimicrobial agent. This method comprises the steps of combining a thermoplastic resin, an antimicrobial agent, and an antioxidant, followed by melt processing the composition. "Melt processing" means the manipulation of the composition at an elevated temperature, which is typical when forming the composition into a useful article, particularly a fiber or film which has a large surface to volume ratio.

The compositions of the invention have a substantial advantage over unstabilized prior compositions. Either less of the antimicrobial agent can be used to provide a desired level of antimicrobial activity, or a given amount of the antimicrobial agent can provide greater activity.

DETAILED DESCRIPTION OF THE INVENTION

Compositions according to the present invention comprise one part by weight of an antimicrobial agent and from 0.1 to 50 parts, preferably from 1 to 5 parts by weight of an additive referred to here as a "stabilizer" which prevents thermal and oxidative degradation of the antimicrobial agent in the composition.

The contemplated antimicrobial agents stabilized according to the present invention include all those specified in the Background Art section, others known to those of ordinary skill in the art, and mixtures thereof. The preferred antimicrobial agents are as follows:

10,10'-oxybisphenoxarsine (OBPA);
10,10'-oxybisphenarsazine;
bis-n-tributyltin oxide;
zinc Omadine; and
N-(trichloromethylthio)cyclohexenedicarboxamide.

Broadly speaking, the stabilizers contemplated herein can be any material which is stable with respect to the selected antimicrobial agent and under melt processing conditions and which will protect the chosen antimicrobial agent against degradation due to exposure of the composition to heat and oxygen. Epoxidized soybean oil also has utility as an antioxidant.

The preferred antioxidants contemplated herein are selected from the group consisting of: hindered phenols (examples of which are 2,6-di-t-butyl-p-cresol or 2,6-di-t-butyl-4-methylphenol); polyphenols (an example of which is tetrakis(methylene-3-(3,5-di-t-butyl-4-hydroxyhydrocinnamate))methane, sold by Ciba-Geigy Corporation as Irganox 1010; phosphites (an example of which is tris-(2,4-di-t-butylphenyl)phosphite, sold by Ciba-Geigy Corporation, under the trade name Irgafos 168 and as a 1:1 mixture with N,N'-hexamethylene-bis-(3,5-di-t-butyl-4-hydroxyhydrocinnanamide) (Irganox 1098) under the trade name Irganox B 1171); thioesters (e.g. distearyl thiodipropionate); 1,3,5-tris(4-t-butyl-3-hydroxy-2,6-dimethylbenzyl)-s-triazine-2,4,6-(1H,3H,5H)trione; nickel bis(0-ethyl(3,5-di-t-butyl-4-hydroxylbenzyl)phosphonate; zinc 2-mercaptobenzimidazole; aromatic amines (such as N-phenyl-alpha-naphthylamine or alkylated diphenylamines); and combinations of the above.

The synergists contemplated herein are compounds which render the stabilizers more effective, typically by increasing the efficacy of the chosen stabilizer as an antioxidant for the antimicrobial compound. Two exemplary synergists are distearylthiodipropionate (DSTDP) and tris-(2,4-di-t-butylpheyl)phosphite. Other contemplated synergists, which also have utility as antioxidants, are the following compounds 2-mercapto-4-methylbenzimidazole;
2-mercapto-5-methylbenzimidazole;
zinc salt of 2-mercaptobenzimidazole;
2-mercaptotoluimidazole; and
zinc 2-mercaptotoluimidazole.

These are listed as compounds H-1 (2 entries), H-2, H-7, and H-8 in the preceding list of antioxidants. Other synergists known to the art are also contemplated for use herein.

A third ingredient contemplated within the scope of the present invention is a predominant proportion of a polymeric resin, optionally including the usual modifiers and process aids employed in the rubber and plastic formulation arts. Two resin compositions are particularly contemplated herein. First is a concentrate composition containing 1 to 80 percent (all numbers stated herein are by weight unless otherwise indicated) of an antimicrobial agent, a stabilizer, and enough of a polymeric resin to improve the dispersibility of the other ingredients. Second is a composition containing at least about 90% of the resin, preferably from 99 to about 99.99 percent of the resin, and a minor proportion of the antimicrobial agent and its stabilizer. The first composition has utility as a concentrated antimicrobial agent premix which can be readily and uniformly dispersed in a resin composition. The second composition has direct utility as a thermoplastic resin composition for fabrication into useful articles having antimicrobial protection. Other proportions of ingredients are also contemplated.

The resins contemplated for use herein are exemplified by the description in the Background Art section of the specification. Other resins not specified herein are also contemplated within the scope of the invention. The preferred resins are polyamides and polyvinyl chloride, which derive particular benefit from the invention because they are not conventionally compounded with resin antioxidants. Optional resin modifiers contemplated herein include plasticizers; extenders; stabilizers to deter degradation caused by environmental heat and light; fillers; dyes and pigments; flame retardants; lubricants; blowing agents; and so forth. The additives chosen for a particular composition are determined by the desired properties of the final composition. The range of possible additives is limited only by the need to ensure compatibility of all the components of the final composition.

The desired concentrations of the antimicrobial agent and additives in resin compositions are a complex function of the inherent activity of the agent, the tendency toward thermal degradation in other ingredients such as the resin, and the temperature and duration of fabrication. Generally the amount of additive desired is from 0.1 to 50 times, and preferably from about one to about five times the amount of the antimicrobial agent, and the active antimicrobial agent desirably comprises from 0.005% (50 ppm) to 1.0% (10,000 ppm) by weight of the thermoplastic composition. One exemplary unprocessed thermoplastic composition according to the present invention contains from about 170 to about 450 ppm (preferably 220 ppm) of the selected antimicrobial agent and enough of the selected antioxidant that, following heat processing, at least 100 ppm of the active antimicrobial agent will remain. Another exemplary unprocessed thermoplastic composition according to the present invention contains from about 85 to about 220 ppm of the selected antimicrobial agent, and enough of the chosen antioxidant that, after heat processing, at least 50 ppm of the active antimicrobial agent will remain.

It will be appreciated that the ratio:

$$\frac{\text{Active Ingredient final}}{\text{Active Ingredient initial}}$$

will depend on the selection of the antimicrobial agent, the identity and amount of the resin and modifiers selected, the processing conditions, and other factors, so no universal ratio can be stated. However, inclusion of an effective antioxidant will always bring the above-stated ratio nearer to its ideal value of 1.0.

In the preferred OBPA composition containing nylon, OBPA, and an amount of an antioxidant sufficient to provide protection during heat processing, the ratio of initial OBPA to final OBPA is about 0.60. Thus, if at least about 100 ppm of OBPA is desired in a fiber, about 170 ppm to about 450 ppm of OBPA is incorporated in the original composition. (If the antioxidant were absent, a final effective level of 100 ppm in nylon fibers would require incorporation of about 500 ppm—three times the level of addition required if the present invention is practiced.) If at least about 50 ppm of OBPA is desired in a fiber, from about 85 to about 220 ppm of OBPA and an effective amount of an antioxidant are incorporated in the composition.

A preferred method for preparing the stabilized plastic compounds is to prepare a blend of the selected resin and antimicrobial agent in which the antimicrobial agent is included in a concentrate as described by Rei in U.S. Pat. No. 4,086,297. The patent is hereby incorporated herein by reference. The blend is then mixed with the desired resin and modifiers.

Compositions specifically contemplated for use herein include those comprising polycaprolactam resin, OBPA as an antimicrobial agent, and a phosphite stabilizer. Nylon is selected because of its desirable properties as a fiber, particularly as a carpet fiber. Nylon fibers are also formed at a high temperature, for example about 285° C. for Nylon 6 (300° C. for Nylon 6,6), and thus antimicrobial agents contained in nylon compositions have previously been substantially or completely inactivated during processing. OBPA is selected because it has a high level of antimicrobial activity, particularly when it is stabilized as taught herein. Phosphite stabilizers are selected because they can protect the microbial agent at the relatively high processing temperature used when fabricating nylon fibers.

Practice of the method inventions taught herein is described or self-evident from the preceding composition description and following examples.

EXAMPLES 1–6

Nylon 6 (polycaprolactam) chips were mixed with processing additives as defined below and with a concentrate of an antimicrobial agent previously prepared according to U.S. Pat. No. 4,086,297 (Rei) to achieve the blend compositions shown

TABLE I

| Example | 1 | 2 | 3 |
|---|---|---|---|
| Polycaprolactam (fiber grade) | 99.95% | 96.55% | 93.45% |
| OBPA | 0.05 | 0.05 | 0.05 |
| Tinuvin 234 | — | 1.5 | 1.5 |
| Distearylthio-dipropionate | — | 0.4 | 0.4 |
| Irganox 1098 | — | — | — |
| Irganox B1171 | — | — | — |
| Irganox 1010 | — | 1.5 | — |
| Irganox B215 | — | — | 4.5 |
| Nickel dithio- | — | — | — |

TABLE I-continued

| | | | |
|---|---|---|---|
| carbamate | | | |
| Mineral oil | — | — | 0.1 |

| Example | 4 | 5 | 6 |
|---|---|---|---|
| Polycaprolactam (fiber grade) | 96.45% | 94.95% | 96.45% |
| OBPA | 0.05 | 0.05 | 0.05 |
| Tinuvin 234 | 1.5 | 1.5 | 1.5 |
| Distearylthiodipropionate | 0.4 | 0.4 | 0.4 |
| Irganox 1098 | 1.5 | — | — |
| Irganox B1171 | — | 3.0 | — |
| Irganox 1010 | — | — | — |
| Irganox B215 | — | — | — |
| Nickel dithiocarbamate | — | — | 1.5 |
| Mineral Oil | 0.1 | 0.1 | 0.1 |

The blend compositions were each extruded into strands approximately 1/16 inch in diameter, cooled in a water bath, and immediately cut into pellets ⅛ inch long. These pellets were then melt-spun into nylon fibers according to techniques commonly known in the industry. The maximum processing temperature was about 285 degrees Celsius.

The fibers were subsequently evaluated for their biological activity by placing each one on a microbiological growth medium, solidified with agar, which had previously been inoculated with an actively growing culture of *Staphylococcus aureus*.

After incubating the media for 24 hours, the biological activity of each fiber sample was evaluated by measuring the width of the region around the fibers on the agar surface where no visible bacterial growth was evident. This width is defined as a Zone of Inhibition. Another evaluation of biological activity was made by extracting a specimen of each of the test samples with methanol. The extracted material was assayed by high performance liquid chromatography for recovery of the active antimicrobial agent. These results are tabulated in Table II.

TABLE II

| Example | Zone of Inhibition (mm) | OBPA % recovered |
|---|---|---|
| 1 | 3 | 11 |
| 2 | 5 | 59 |
| 3 | 7 | 52 |
| 4 | 6 | 69 |
| 5 | 5 | 59 |
| 6 | 5 | 58 |

It will be evident to those skilled in the art that the optimum treatment need not result in 100% recovery of OBPA, since it is added at a very low level and may be unavailable for analysis as the result of incomplete extraction.

These examples show that more undegraded OBPA remains in processed compositions 2-6 which also contain a stabilizing agent, and that the stabilized OBPA of Examples 2-6 is much more microbiocidally active than unstabilized OBPA of Example 1. (It should be understood that the Zone of Inhibition Test is conservative and underestimates the advantage of employing an antioxidant.)

The advantages of the higher active level of an antimicrobial agent resulting from stabilization will be evident to those skilled in the art. For one thing the stabilized fibers can be subjected to a greater amount of post-finishing than unstabilized compositions without reducing the amount or potency of the antimicrobial agent in the fiber when it is put into use.

EXAMPLES 7-10

Unstabilized powdered polypropylene (sold under the trademark Profax 6301 PM by Hercules, Inc., Wilmington, Del.) was mixed with OBPA prepared according to U.S. Pat. No. 4,086,297 and processing additives as follows:

TABLE III

| Example | 7 | 8 | 9 | 10 |
|---|---|---|---|---|
| Polypropylene (Profax 6301) | 99.95 | 98.70 | 97.95 | 96.95 |
| OBPA | 0.05 | 0.05 | 0.05 | 0.05 |
| Irganox 1010 | — | 1.0 | 1.0 | 1.0 |
| Distearylthiodipropionate | — | 0.25 | — | — |
| Tinuvin 770 | — | — | 1.0 | 2.0 |

The blends were converted into pellets by melt extrusion as in the previous examples. These pellets were melt-spun into polypropylene fibers according to techniques commonly known to the industry.

Microbiological effectiveness and active ingredient levels were obtained as in the previous examples and the results are presented in Table IV.

TABLE IV

| Example | Zone of Inhibition (mm) | OBPA % Recovered |
|---|---|---|
| 7 | 0 | 38 |
| 8 | 7 | 52 |
| 9 | 7 | 59 |
| 10 | 6 | 58 |

Again, the fibers of Examples 8-10, which contain a stabilizer for the antimicrobial agent, contain more extractable antimicrobial agent and provide a much greater zone of inhibition than the fiber of Example 7 which contains no stabilizer.

EXAMPLE 11

In this example a polyvinyl chloride film composition containing stabilized OBPA is formed using conventional technology.

The formulation of the base film is:

TABLE V

| Component | Weight (g) |
|---|---|
| Polyvinyl chloride resin | 100.00 |
| Di-2-ethylexyl phthalate (DOP) | 40.00 |
| Epoxidized soybean oil | 7.70 |
| UV Stabilizer (Mark 202A) | 1.00 |
| Heat Stabilizer (Mark KCB) | 3.50 |
| Heat Stabilizer (Mark C) | 1.50 |
| Stearic Acid | 0.25 |
| OBPA concentrate* | .05 |

*expressed as amount of pure OBPA
("Mark" is a trademark for heat and light stabilizers sold by Argus Chemical Corp., Brooklyn, New York. DOP is a plasticizer, stearic acid is a lubricant, and epoxidized soybean oil is an antioxidant.)

Films are prepared by milling the components of the base until a uniform dispersion is obtained, at which time 0.05% by weight of carbon black is added.

The film is extrusion cast using conventional equipment at a processing temperature of 375 degrees Fahrenheit (191 degrees Celsius). The final film has a thickness of about 20 mils (500 microns). A control film is made in the same manner except that the stabilizer is omitted. The microbiocidal activity of the film is measured by cutting small round pieces of the test and control films, placing each one on an innoculated growth medium as described in Examples 1-6, and proceeding as described in those examples to develop and measure a Zone of Inhibition. The test samples are then extracted with methanol and the amount of recovered active ingredient is measured as described in Examples 1-6. Results comparable to those set forth in Examples 1-6 are obtained, illustrating that the invention can be used to improve antimicrobial films.

EXAMPLE 12

Examples 1 and 2 are repeated, except the OBPA is replaced in separate trials by each of the antimicrobial agents specified in the Background Art section of the present specification. The compositions analogous to Example 2 show much greater antimicrobial activity and a much greater recovery of the active antimicrobial agent than the corresponding compositions analogous to Example 1. This illustrates the applicability of the invention to each of the named antimicrobial agents.

EXAMPLE 13

Examples 1 and 2 are repeated, except the antioxidant (Irganox 1010) of Example 2 is replaced, in separate trials, by each of the antioxidants set forth in the Background Art section of the present specification. The compositions analogous to Example 2 show much greater antimicrobial activity and a much greater recovery of the active antimicrobial agent than the corresponding compositions analogous to Example 1. Thus, a wide range of antioxidants can be used to practice the invention.

EXAMPLE 14

Examples 1 and 2 are repeated, replacing polycaprolactam with each of the resins specified in the Background Art section of the present application in separate trials. Similar results are again obtained, and show the value of the invention for improving the antimicrobial properties of many different resin compositions.

EXAMPLE 15

The following test composition was blended and formed into test fibers according to the procedure described in Examples 1-6:

| Ingredient | Wt. % |
|---|---|
| polycaprolactam | 98.96 |
| Irganox B1171 | 0.50 |
| Tinuvin T234 | 0.50 |
| OBPA | 0.04 |
| Total | 100.00 |

The fibers were then subjected to a modified continuous dyeing process adapted to simulate commercial continuous dyeing processes. The fibers were wet with a 0.1% by weight aqueous solution of a nonionic surfactant sold under the trademark Alrowet by Ciba-Geigy Corporation, Dyestuffs and Chemicals Division, Greensboro N.C.; followed by an aliquot of an aqueous solution adjusted to a pH value of 6.0 and containing 0.1% of the same surfactant and 2% of a dye sold under the trademark "Tectilon Blue 4RKWL" by Ciba-Geigy Corporation, Dyestuffs and Chemicals Division, Greensboro, N.C. The saturated fibers were steamed for 360 seconds at 101° C. and atmospheric pressure, followed by three rinses, each one liter of 40° C. tap water.

Fibers so treated were found to have retained all of their antimicrobial potency and 76% of their OBPA, as measured by high performance liquid chromatography.

EXAMPLE 16

Test fibers like those of Example 15 were used again here. A control composition lacking Irganox B1171 antioxidant but otherwise containing the same ingredients in the same proportions was processed in the same manner, then formed into control fibers.

The test and control fibers were then subjected to Beck mock-dyeing. Mock dye baths were prepared having a pH of 4.0 and containing 0.1% Triton X-100 surfactant in aqueous solution. In separate trials, 5% and 10% (based on the weight of the dye bath) of the test and control fibers were added to the boiling dye baths. The dye baths were boiled for up to 30 minutes.

The baths were then analyzed for arsenic content. The baths used to boil the control fibers contained about three times as much arsenic as the corresponding baths used to boil the test fibers containing an antioxidant. Thus, use of an antioxidant to preserve an antimicrobial agent in these fiber compositions reduces the loss of decomposition products of the antimicrobial agent into the dye bath, and thus into the dye effluent.

What is claimed is:

1. A thermoplastic composition which will be resistant to microbial attack after being processed at an elevated temperature, comprising a homogeneous mixture of:
   A. a polyamide resin;
   B. an antimicrobial agent; and
   C. an amount of an antioxidant effective to reduce degradation of said antimicrobial agent while said composition is being melt-processed.

2. The composition of claim 1, wherein said antioxidant is at least one member selected from the group consisting of:
monophenols;
bisphenols
thiobisphenols;
polyphenols;
hydroquinones;
phosphites;
thioesters;
naphthylamines;
diarylamines;
p-phenylenediamines;
quinolines;
blended amines;
0,0-di-n-octadecyl(3,5-di-t-butyl-4-hydroxybenzyl)-phosphonate);
1,6-hexamethylene bis(3,5-di-t-butyl-4-hydroxyhydrocinnamate);
1,6-hexamethylene bis(3-(3,5-di-t-butyl-4-hydroxyphenyl)propionate);
thiodiethylene bis(3,5-di-t-butyl-4-hydroxy)hydrocinnamate;
thiodiethylene bis(3-(3,5-di-t-butyl-4-hydroxyphenyl)-propionate);
octadecyl-3-(3,5-di-t-butyl-4-hydroxyphenyl)propionate;
octadecyl-3,5-di-t-butyl-4-hydroxyhydrocinnamate;
3,5-di-t-butyl-4-hydroxyhydrocinnamic acid triester with 1,3,5-tris (2-hydroxyethyl)-s-triazine-2,4,6-(1H,3H,5H)trione;

N-butyryl-p-aminophenol;
N-(4-hydroxyphenyl)butyramide;
N-pelargonoyl-p-aminophenol;
N-(4-hydroxyphenyl)pelargonamide;
N-lauroyl-p-aminophenol;
N-(4-hydroxyphenyl)dodecanamide;
2,6-di-t-butyl-alpha-dimethylamino-p-cresol;
2,6-di-t-butyl-4-(dimethylaminomethyl)phenol;
1,3,5-tris(4-t-butyl-3-hydroxy-2,6-dimethylbenzyl)-s-triazine-2,4,6-(1H,3H,5H)trione;
nickel bis(0-ethyl(3,5-di-butyl-4-hydroxybenzyl)phosphonate);
2,2′-oxamidobisethyl-3-(3,5-di-t-butyl-4-hydroxyphenyl)propionate;
tris(2-t-butyl-4-(2-methyl-4-hydroxy-5-t-butylphenyl-thio)-5-methyl)-phenylphosphite;
bis(3,3-bis(4-hydroxy-3-t-butylphenyl)butanoic acid glycolester;
tetrakis(2,4-di-t-butylphenyl)-4,4′-biphenylylenediphosphonite;
n-propyl gallate;
n-propyl-3,4,5-trihydroxybenzoate;
calcium bis(0-ethyl(3,5-di-t-butyl-4-hydroxybenzyl)-phosphonate);
2-mercapto-4-methylbenzimidazole;
2-mercapto-5-methylbenzimidadole;
zinc salt of 2-mercaptobenzimidazole;
2-mercapto-4-methylbenzimidazole, zinc salt;
2-mercapto-5-methylbenzimidazole, zinc salt;
2-mercaptotoluimidazole;
zinc 2-mercaptotoluimidazole;
dioctadecyl disulfide;
metal aromatic sulfonates;
nickel di-n-butyldithiocarbamate;
nickel diisobutyldithiocarbamate;
nickel dimethyldithiocarbamate;
3,9-bis(3-cyclohexenyl)-2,4,8,10-tetraoxaspiro(5,5)undecane; and
tris (5-norbornene-2-methyl)phosphite.

3. The composition of claim 1, wherein said antioxidant is 2,6-di-t-butyl-p-cresol.

4. The composition of claim 1, wherein said antioxidant is 2,6-di-t-butyl-4-methylphenol.

5. The composition of claim 1, wherein said antioxidant is tetrakis(methylene-3-(3,5-di-t-butyl-4-hydroxyhydrocinnamate))methane.

6. The composition of claim 1, wherein said antioxidant is tris-(2,4-di-t-butylphenyl)phosphite.

7. The composition of claim 1, wherein said antioxidant is distearyl thiodipropionate.

8. The composition of claim 1, wherein said antioxidant is 1,3,5-tris(4-t-butyl-3-hydroxy-2,6-dimethylbenzyl)-s-triazine-2,4,6-(1H,3H,5H)trione.

9. The composition of claim 1 wherein said antioxidant is nickel bis(O-ethyl(3,5-di-t-butyl-4-hydroxylbenzyl)phosphonate).

10. The composition of claim 1, wherein said antioxidant is zinc 2-mercaptobenzimidazole.

11. The composition of claim 1, wherein said antioxidant is N-phenyl-alpha-naphthylamine.

12. The composition of claim 1, wherein said antioxidant is an alkylated diphenylamine.

13. The composition of claim 1, wherein said antioxidant is N,N′-hexamethylene bis(3,5-di-t-butyl-4-hydroxyhydrocinnamamide).

14. The composition of claim 1, wherein said antioxidant is N,N′-hexamethylene bis(3-(3,5-di-t-butyl-4-hydroxyphenyl)propionamide.

15. The composition of claim 1, wherein said antioxidant is 1,6-hexamethylene bis-(3,5-di-t-butyl-4-hydroxyhydrocinnamide).

16. The composition of claim 1, wherein said antioxidant is tetrakis(methylene 3,5-di-t-butyl-4-hydroxyphenyl propionate)methane.

17. The composition of claim 1, wherein said antioxidant is tetrakis(methylene-3,5-di-t-butyl-4-hydroxyhydrocinnamate)methane.

18. The composition of claim 1, wherein said antioxidant is nickel dithiocarbamate.

19. The composition of claim 1, wherein said resin is polycaprolactam.

20. The composition of claim 1, wherein said antimicrobial agent comprises from about 170 to about 450 ppm of 10,10′-oxybisphenoxarsine, and provides an active level of 10,10′-oxybisphenoxarsine of at least about 100 ppm after said processing at an elevated temperature.

21. The composition of claim 1, wherein said antimicrobial agent comprises from about 85 to about 220 ppm of 10,10′-oxybisphenoxarsine, and provides an active level of 10,10′-oxybisphenoxarsine of at least 50 ppm after said processing at an elevated temperature.

22. The composition of claim 20, wherein said antimicrobial agent comprises about 170 ppm thereof.

23. The composition of claim 20, wherein said antimicrobial agent comprises about 200 ppm thereof.

24. The composition of claim 1, wherein said antimicrobial agent is 10,10′-oxybisphenoxarsine, said antioxidant is at least one member selected from the group consisting of:
distearyldithiopropionate;
N,N′-hexamethylene bis(3,5-di-t-butyl-4-hydroxyhydrocinnamamide);
N,N′-hexamethylene bis(3,5-di-t-butyl-4-hydroxyhydrocinnamide);
1,6-hexamethylene bis-(3,5-di-t-butyl-4hydroxyhydrocinnamide);
tris-(2,4-di-t-butylphenyl)phosphite;
tetrakis(methylene-3-(3,5-di-t-butyl-4-hydroxyhydrocinnamate))methane; and
nickel dithiocarbamate;
and said resin is polycaprolactam.

25. The composition of claim 24, wherein said 10,10′-oxybisphenoxarsine comprises from about 170 to about 450 ppm thereof, and provides an active level of said 10,10′-oxybisphenoxarsine of at least about 100 ppm after said processing at an elevated temperature.

26. The composition of claim 24, wherein said 10,10′-oxybisphenoxarsine comprises from about 85 to about 220 ppm thereof and provides an active level of said 10,10′-oxybisphenoxarsine of at least 50 ppm after said processing at an elevated temperature.

27. The composition of claim 24, wherein said 10,10′-oxybisphenoxarsine comprises about 170 ppm thereof.

28. The composition of claim 24, wherein said 10,10′-oxybisphenoxarsine comprises about 200 ppm thereof.

29. An article selected from the group consisting of fibers and films, said article having resistance to microbial attack, said article comprising a homogeneous mixture of:
   A. a polyamide resin;
   B. an antimicrobial agent; and
   C. an antioxidant;
wherein said ingredients A, B, and C are combined to form a composition before said composition is melt-processed to form said article.

30. The article of claim 29, wherein said antioxidant is at least one member selected from the group consisting of:
monophenols;
bisphenols;
thiobisphenols;
polyphenols;
hydroquinones;
phosphites;
thioesters;
naphthylamines;
diarylamines;
p-phenylenediamines;
quinolines;
blended amines;
O,O-di-n-octadecyl(3,5-di-t-butyl-4-hydroxybenzyl)-phosphonate;
1,6-hexamethylene bis(3,5-di-t-butyl-4-hydroxyhydrocinnamate;
1,6-hexamethylene bis(3-(3,5-di-t-butyl-4-hydroxyphenyl)propionate);
thiodiethylene bis(3,5-di-t-butyl-4-hydroxy)hydrocinnamate;
thiodiethylene bis(3-(3,5-di-t-butyl-4-hydroxyphenyl)propionate);
octadecyl-3-(3,5-di-t-butyl-4-hydroxyphenyl)propionate;
octadecyl-3,5-di-t-butyl-4-hydroxyhydrocinnamate;
3,5-di-t-butyl-4-hydroxyhydrocinnamic acid triester with 1,3,5-tris(2-hydroxyethyl)-s-triazine-2,4,6-(1H,3H,5H)trione;
N-butyryl-p-aminophenol;
N-(4-hydroxyphenyl)butyramide;
N-pelargonoyl-p-aminophenol;
N-(4-hydroxyphenyl)pelargonamide;
N-lauroyl-p-aminophenol;
N-(4-hydroxyphenyl)dodecanamide;
2,6-di-t-butyl-alpha-dimethylamino-p-cresol;
2,6-di-t-butyl-4-(dimethylaminomethyl)phenol;
1,3,5-tris(4-t-butyl-3-hydroxy-2,6-dimethylbenzyl)-s-triazine-2,4,6-(1H,3H,5H)trione;
nickel bis(0-ethyl(3,5-di-t-butyl-4-hydroxybenzyl)phosphonate);
2,2'-oxamidobisethyl-3-(3,5-di-t-butyl-4-hydroxyphenyl)propionate;
tris(2-t-butyl-4-(2-methyl-4-hydroxy-5-t-butylphenylthio)-5-methyl)-phenylphosphite;
bis(3,3-bis(4-hydroxy-3-t-butylphenyl)butanoic acid glycolester;
tetrakis(2,4-di-t-butylphenyl)-4,4'-biphenylylenediphosphonite;
n-propyl gallate;
n-propyl-3,4,5-trihydroxybenzoate;
calcium bis(0-ethyl(3,5-di-t-butyl-4-hydroxybenzyl)-phosphonate);
2-mercapto-4-methylbenzimidazole;
2-mercapto-5-methylbenzimidazole;
zinc salt of 2-mercaptobenzimidazole;
2-mercapto-4-methylbenzimidazole, zinc salt;
2-mercapto-5-methylbenzimidazole, zinc salt;
2-mercaptotoluimidazole;
zinc-2-mercaptotoluimidazole;
dioctadecyl disulfide;
metal aromatic sulfonates;
nickel di-n-butyldithiocarbamate;
nickel diisobutyldithiocarbamate;
nickel dimethyldithiocarbamate;
3,9-bis(3-cyclohexenyl)-2,4,8,10-tetraoxaspiro(5,5)undecane; and
tris(5-norbornene-2-methyl)phosphite.

31. The article of claim 30, wherein said resin is polycaprolactam.

32. The article of claim 29, wherein said antimicrobial agent is 10,10'-oxybisphenoxarsine, said antioxidant is at least one member selected from the group consisting of:
distearyldithiopropionate;
N,N'-hexamethylene bis(3,5-di-t-butyl-4-hydroxyhydrocinnamamide);
N,N'-hexamethylene bis(3-(3,5-di-t-butyl 4-hydroxyphenyl)propionamide);
1,6-hexamethylene bis(3,5-di-t-butyl-4-hydroxyhydrocinnamide);
tris-2(2,4-di-t-butylphenyl)phosphite;
tetrakis(methylene-3-(3,5-di-t-butyl-4-hydroxyhydrocinnamate)methane; and
nickel dithiocarbamate;
and said resin is polycaprolactam.

33. The composition of claim 1, wherein the weight ratio of said antimicrobial agent to said stabilizer is from about 1:1 to about 1:5.

34. The composition of claim 24, wherein the weight ratio of said antimicrobial agent to said stabilizer is from about 1:1 to about 1:5.

35. A thermoplastic composition which will be resistant to microbial attack after being processed at an elevated temperature, comprising a homogeneous mixture of:
A. a resin selected from the group consisting of polypropylene, polyamide, and polyvinyl chloride;
B. an antimicrobial agent; and
C. an amount of an antioxidant effective to reduce degradation of said antimicrobial agent while said composition is being melt processed, wherein said antioxidant is at least one member selected from the group consisting of:
hydroquinones;
thioesters;
naphthylamines;
diarylamines;
p-phenylenediamines;
quinolines;
blended amines;
tetrakis(2,4-di-t-butylphenyl)-4,4'-biphenylylenediphosphonite;
2-mercapto-4-methylbenzimidazole;
2-mercapto-5-methylbenzimidazole;
zinc salt of 2-mercaptobenzimidazole;
2-mercapto-4-methylbenzimidazole, zinc salt;
2-mercapto-5-methylbenzimidazole, zinc salt;
2-mercaptotoluimidazole;
zinc 2-mercaptotoluimidazole;
dioctadecyl disulfide;
metal aromatic sulfonates;
nickel di-n-butyldithiocarbamate;
nickel diisobutyldithiocarbamate;
nickel dimethyldithiocarbamate; and
3,9-bis(3-cyclohexenyl)-2,4,8,10-tetraoxaspiro(5,5)undecane.

36. The composition of claim 35, wherein said antioxidant is distearyl thiodipropionate.

37. The composition of claim 35, wherein said antioxidant is zinc 2-mercaptobenzimidazole.

38. The composition of claim 35, wherein said antioxidant is N-phenyl-alpha-naphthylamine.

39. The composition of claim 35, wherein said antioxidant is an alkylated diphenylamine.

40. The composition of claim 35, wherein said antioxidant is nickel dithiocarbamate.

41. The composition of claim 35, wherein said resin is a polyamide.

42. The composition of claim 35, wherein said resin is polycaprolactam.

43. The composition of claim 35, wherein said antimicrobial agent comprises from about 170 to about 450 ppm of 10,10'-oxybisphenoxarsine, and provides an active level of 10,10'-oxybisphenoxarsine of at least about 100 ppm after said processing at an elevated temperature.

44. The composition of claim 43, wherein said antimicrobial agent comprises about 170 ppm thereof.

45. The composition of claim 43, wherein said antimicrobial agent comprises about 200 ppm thereof.

46. The composition of claim 35, wherein said antimicrobial agent comprises from about 85 to about 220 ppm of 10,10'-oxybisphenoxarsine, and provides an active level of 10,10'-oxybisphenoxarsine of at least 50 ppm after said processing at an elevated temperature.

47. The composition of claim 35, wherein the weight ratio of said antimicrobial agent to said stabilizer is from about 1:1 to about 1:5.

48. The composition of claim 35, wherein said antimicrobial agent is 10,10'-oxybisphenoxarsine, said antioxidant is at least one member selected from the group consisting of:
distearyldithiopropionate; and
nickel dithiocarbamate;
and said resin is polycaprolactam.

49. The composition of claim 48, wherein the weight ratio of said antimicrobial agent to said stabilizer is from about 1:1 to about 1:5.

50. An article selected from the group consisting of fibers and films, said article having resistance to microbial attack, said article comprising a homogeneous mixture of:
A. a polymeric resin selected from the group consisting of polyamides, polyvinyl chlorides and polypropylene;
B. an antimicrobial agent; and
C. an antioxidant;
wherein said ingredients A, B, and C are combined to form a composition before said composition is melt-processed to form said article, and wherein said antioxidant is at least one member selected from the group consisting of:
hydroquinones;
thioesters;
naphthylamines;
diarylamines;
p-phenylenediamines;
quinolines;
blended amines;
tetrakis(2,4-di-t-butylphenyl)-4,4'-biphenylylenediphosphonite;
2-mercapto-4-methylbenzimidazole;
2-mercapto-5-methylbenzimidazole;
zinc salt of 2-mercaptobenzimidazole;
2-mercapto-4-methylbenzimidazole, zinc salt;
2-mercapto-5-methylbenzimidazole, zinc salt;
2-mercaptotoluimidazole;
zinc-2-mercaptotoluimidazole;
dioctadecyl disulfide
metal aromatic sulfonates;
nickel di-n-butyldithiocarbamate;
nickel diisobutyldithiocarbamate;
nickel dimethyldithiocarbamate; and
3,9-bis(3-cyclohexenyl)-2,4,8,10-tetraoxaspiro(5,5)undecane.

51. The article of claim 50, wherein said resin is a polyamide.

52. The article of claim 51, wherein said resin is polycaprolactam.

53. The article of claim 50, wherein said antimicrobial agent is 10,10'-oxybisphenoxarsine, said antioxidant is at least one member selected from the group consisting of:
distearyldithiopropionate; and
nickel dithiocarbamate;
and said resin is polycaprolactam.

54. A method for melt processing a composition comprising a thermoplastic resin and an antimicrobial agent while maintaining the efficacy of said agent, comprising the following steps performed in the order stated:
A. combining said thermoplastic resin, said antimicrobial agent, and an antioxidant to form a protected antimicrobial resin composition; and
B. melt processing said protected antimicrobial resin composition.

55. A method for providing a desired final active level of at least 1 part by weight of 10,10'-oxybisphenoxarsine in a composition following heat processing thereof, comprising the steps of:
A. providing a thermoplastic composition comprising a major proportion of a resin selected from the group consisting of polypropylene, polyamide, and polyvinyl chloride; about 1.7 parts by weight of 10,10'-oxybisphenoxarsine; and from about 1.7 to about 8.5 parts by weight of an antioxidant; and
B. processing said composition at a temperature of at lest about 275 degrees Celsius;
thereby providing a heat-processed composition containing at least about 1.0 parts by weight of said 10,10'-oxybisphenoxarsine in active form.

56. The method of claim 55, wherein said resin is a polyamide resin.

57. The method of claim 55, wherein said processing step is carried out by melt processing said thermoplastic composition to form an article selected from the group consisting of fibers and films.

58. The method of claim 57, comprising the subsequent step of vat dyeing said article.

59. The method of claim 58, wherein said article is a carpet fiber.

60. A method for melt-processing a composition comprising a thermoplastic polyamide resin and an antimicrobial agent while maintaining the efficacy of said agent, comprising the following steps performed in the order stated:
A. combining said thermoplastic polyamide resin, said antimicrobial agent, and an antioxidant homogeneously to form a protected antimicrobial resin composition; and
B. melt-processing said protected antimicrobial resin composition.

61. A method for providing a desired final active level of at least 1 part by weight of 10,10'-oxybisphenoxarsine in a composition following heat processing thereof, comprising the steps of:
A. providing a thermoplastic composition comprising about 1.7 parts by weight of 10,10'-oxybisphenoxarsine, from about 1.7 to about 8.5 parts by weight of an antioxidant, and a major proportion of a polyamide resin; and B. processing said thermoplastic composition at a temperature of at least about 275 degreess Celsius; thereby providing a heat-processed composition containing about 1.0 parts by weight of said 10,10'-oxybisphenoxarsine in active form.

62. The method of claim 61, wherein said processing step is carried out by melt processing said thermoplastic composition to form an article selected from the group consisting of fibers and films.

63. The method of claim 62, comprising the subsequent step of vat dyeing said article.

64. The method of claim 63, wherein said article is a carpet fiber.

* * * * *

UNITED STATES PATENT AND TRADEMARK OFFICE
CERTIFICATE OF CORRECTION

PATENT NO. : 4,624,679

DATED : November 25, 1986

INVENTOR(S) : Thomas C. McEntee

It is certified that error appears in the above—identified patent and that said Letters Patent is hereby corrected as shown below: Title page:

In the Title, line 2, change "ANTIMICORBIAL" to -- ANTIMICROBIAL --.

Column 14, line 67, delete the parenthesis before "Bis".

Column 15, line 16, insert -- 8. -- before "Phenol/aldehyde condensates".

Column 17, lines 11-13, the subtitle "F THIOESTERS" should be moved to Column 17, line 31, before "1. Dilauryl thiodipropionate".

Column 37, the first structure under No. 10, add a parenthesis before "CH$_2$)$_5$; line 50, change "As" to -- as --.

Column 42, line 59, change "-butylpheyl) to -- "-butylphenyl) --

Column 45, line 17, insert the following paragraph:
(OBPA is added as a 5% active preparation containing 10,10'-oxybisphenoxarsine dispersed in polycaprolactam, sold by Ventron Division of Morton Thiokol, Inc., Danvers, Massachusetts; the recited proportion is of pure OBPA. Tinuvin 234 is a trademark for an ultraviolet light absorber sold by Ciba-Geigy Corporation. Irganox is a trademark for antioxidants sold by Ciba-Geigy Corporation. The chemical identities of the Irganox materials have been identified previously.)

Column 49, line 17, insert a parenthesis after "butanoic".

Column 51, line 1, change "claiim" to -- claim --; line 49, insert a parenthesis after "butanoic".

Column 52, line 18, insert a second parenthesis [)] after "cinnamate)".

UNITED STATES PATENT AND TRADEMARK OFFICE
CERTIFICATE OF CORRECTION

PATENT NO. : 4,624,679

DATED : November 25, 1986

INVENTOR(S) : Thomas C. McEntee

It is certified that error appears in the above-identified patent and that said Letters Patent is hereby corrected as shown below:

Column 54, line 37, change "lest" to -- least --.

Signed and Sealed this

Thirteenth Day of December, 1988

Attest:

DONALD J. QUIGG

*Attesting Officer*   *Commissioner of Patents and Trademarks*